United States Patent
Ruffini et al.

(10) Patent No.: US 11,811,634 B2
(45) Date of Patent: *Nov. 7, 2023

(54) METHOD AND APPARATUS FOR LATENCY MONITORING

(71) Applicant: Telefonaktiebolaget LM Ericsson (publ), Stockholm (SE)

(72) Inventors: Stefano Ruffini, Pisa (IT); Stefano Stracca, Pisa (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 77 days.

This patent is subject to a terminal disclaimer.

(21) Appl. No.: 17/366,355

(22) Filed: Jul. 2, 2021

(65) Prior Publication Data

US 2021/0336864 A1 Oct. 28, 2021

Related U.S. Application Data

(63) Continuation of application No. 16/466,339, filed as application No. PCT/EP2017/081213 on Dec. 1, 2017, now Pat. No. 11,088,930.

(Continued)

(51) Int. Cl.
*H04L 43/0852* (2022.01)
*H04J 3/14* (2006.01)
(Continued)

(52) U.S. Cl.
CPC ............ *H04L 43/0852* (2013.01); *H04J 3/14* (2013.01); *H04L 43/106* (2013.01); *H04L 45/22* (2013.01);
(Continued)

(58) Field of Classification Search
CPC ... H04L 43/0852; H04L 43/106; H04L 45/22; H04J 3/14; H04W 56/0055; H04W 88/085
See application file for complete search history.

(56) References Cited

U.S. PATENT DOCUMENTS 9,473,261 B1 10/2016 Tse et al.
9,525,482 B1 12/2016 Tse
(Continued)

FOREIGN PATENT DOCUMENTS

CN 101517968 A 8/2009
EP 1914914 A1 4/2008
(Continued)

OTHER PUBLICATIONS

Treytl, Albert, et al., "Secure Tunneling of High-Precision Clock Synchronization Protocols and other Time-Stamped Data", Institute for Integrated Sensor Systems, Austrian Academy of Sciences Viktor-Kaplan-Strasse 2, 2010, 1-8.
(Continued)

*Primary Examiner* — Raj Jain
(74) *Attorney, Agent, or Firm* — Murphy, Bilak & Homiller, PLLC

(57) ABSTRACT

A method of supporting latency monitoring in a network transporting traffic to and from a wireless base station. The method comprises, at a first node of the transport network determining a first timestamp representing a time at which a data element is received at the first node and adding information representative of the first timestamp to a communication signal which carries data for the wireless base station, the data including the data element. The method also comprises sending an indication of an association between the information representative of the first timestamp and the data element that the information representative of the first timestamp relates to. A method performed at a second node as well as apparatus for use at the first node and apparatus for use at the second node are also disclosed.

21 Claims, 17 Drawing Sheets

Related U.S. Application Data

(60) Provisional application No. 62/430,607, filed on Dec. 6, 2016.

(51) Int. Cl.
*H04W 56/00* (2009.01)
*H04W 88/08* (2009.01)
*H04L 43/106* (2022.01)
*H04L 45/00* (2022.01)

(52) U.S. Cl.
CPC ..... *H04W 56/0055* (2013.01); *H04W 88/085* (2013.01); *H04J 2203/0035* (2013.01)

(56) References Cited

U.S. PATENT DOCUMENTS

| | | | |
|---|---|---|---|
| 11,088,930 B2* | 8/2021 | Ruffini | H04J 3/14 |
| 2011/0222412 A1 | 9/2011 | Kompella | |
| 2015/0023203 A1* | 1/2015 | Odell | H04L 43/0852 370/253 |
| 2015/0180788 A1* | 6/2015 | Kompella | H04L 45/00 370/236.2 |
| 2016/0006526 A1* | 1/2016 | Cho | H04J 3/0697 370/503 |
| 2016/0365920 A1 | 12/2016 | Takemoto et al. | |
| 2019/0253167 A1* | 8/2019 | Wihamre | H04L 69/28 |
| 2019/0342198 A1* | 11/2019 | Ruffini | H04J 3/14 |
| 2021/0336864 A1* | 10/2021 | Ruffini | H04W 56/0055 |

FOREIGN PATENT DOCUMENTS

| | | |
|---|---|---|
| EP | 2026510 A1 | 2/2009 |
| WO | 2015113643 A1 | 8/2015 |
| WO | 2015129167 A1 | 9/2015 |
| WO | 2016005008 A1 | 1/2016 |
| WO | 2016138950 A1 | 9/2016 |
| WO | 2017012635 A1 | 1/2017 |

OTHER PUBLICATIONS

Bladsjö, David, et al., "Synchronization Aspects in LTE Small Cells", IEEE Communications Magazine, Sep. 2013, pp. 70-77.
CPRI, "Common Public Radio Interface (CPRI); Interface Specification", CPRI Specification V7.0, Oct. 9, 2015, pp. 1-128.
IEEE, "IEEE Standard for a Precision Clock Synchronization Protocol for Networked Measurement and Control Systems", Technical Committee on Sensor Technology (TC-9), Jul. 24, 2008, pp. 1-289.
Korhonen, Jouni, "RoE timestamp and presentation time in past", May 26, 2016, pp. 1-14.
Unknown, Author, "Internet protocol aspects—Transport Precision time protocol telecom profile for phase/time synchronization with full timing support from the network", Series G: Transmission Systems and Media, Digital Systems and Networks, ITU-T, G.8275.1/Y.1369.1, Jun. 2016, pp. 1-56.
Unknown, Author, "Time and phase synchronization aspects of packet networks", Series G: Transmission Systems and Media, Digital Systems and Networks, ITU-T, G.8271/Y.1366, Jul. 2016, pp. 1-42.
Unknown, Author, "Timing characteristics of synchronous Ethernet equipment slave clock Recommendation", Series G: Transmission Systems and Media, Digital Systems and Networks, ITU-T, G.8262/Y.1362, Jan. 2015, pp. 1-38.
Unknown, Author, "Transparency of mapping of CPRI into OTN phase 2", Huawei Technologies Co., Ltd, China Mobile Communications Corporation, International Telecommunication Union, Feb. 1, 2016, pp. 1-3.

* cited by examiner

METHOD AND APPARATUS FOR LATENCY MONITORING

TECHNICAL FIELD

The present invention relates to communications networks, in general, and in particular to monitoring latency in packet transmission in transport network.

BACKGROUND

A Radio Base Station (RBS) can be functionally separated into a Digital Unit (DU), which generates and processes a digitized baseband RF signal, and a Radio Unit (RU), which creates the analog transmit RF signal from the baseband signal and sources it to the antenna, and respectively digitizes the RF receive signal.

Separating DU and RU (split RBS) creates opportunities for network optimization. The active Remote Radio Head (RRH) is connected to a centralized pool of DUs by means of CPRI (Common Public Radio Interface) flows across a geographical area. Transport of traffic between distributed parts of a split RBS is called "fronthaul". The term "backhaul" describes transport of traffic to/from a base station which has RF and baseband processing at the same site.

Optical technologies, such as integrated photonics, are suitable to realize a transport network for CPRI among Remote Radio Units (RRU) and a DU pool. FIG. 1 illustrates an architecture described in WO2016/005008. Patent application WO2015/113643 describes a framing technique for a robust transport of CPRI over a Wavelength Division Multiplexed (WDM) network.

The optical fronthaul network depicted in FIG. 1 can also be exploited to transport a mix of CPRI traffic, originated by RRUs, and Ethernet traffic originated by RBSs (and pico-RBS in particular). These clients' signals can be delivered over separate lambdas (wavelengths) in the same WDM flow and, alternatively, over a shared lambda (sub-wavelength). An ad-hoc framing for the hybrid CPRI/ETH transport on OFH (optical fronthaul) is described in WO2016/138950. The evolution of optical fronthaul architecture to transport CPRI and Ethernet is named "Optical XHAUL" to specify that the optical network acts as fronthaul for RRUs and as backhaul for RBSs. FIG. 2 shows an example of an XHAUL architecture. The architecture also allows the transport of future Ethernet based fronthaul traffic.

Synchronization needs in base stations are mainly related to the correct generation of the radio signal. This means the generation of the carrier frequency as well as the generation of the data on the air interface frequency synchronization is required in mobile networks, typically in order to allow hand-over of the UE (User Equipment) between cells. Typical requirement in terms of frequency accuracy is 50 ppb.

When Time Division Duplex, TDD, is used, in addition to frequency synchronization, the base station must also have access to an accurate time/phase synchronization reference. This is required for the correct generation of the TDD frame on the radio interface avoiding the interference between the signals generated by adjacent cells. The requirement in this case is in the order of +/−1.5 µs.

The evolution of mobile networks is also presenting an increased demand to coordinate radio base stations and therefore also requiring the distribution of a phase/time sync reference, in some case with accuracy in the few tens of ns range (e.g. +/−130 ns in case of some Carrier Aggregation configurations).

In general, the requirements on synchronization accuracy and latency will depend on the type of radio features that are planned to be used to manage inter-cell interference. In particular some of the radio coordination techniques put very stringent requirements both in terms of latency and in terms of timing accuracy so that these features are currently intended to be limited to pure centralized baseband scenarios.

International Patent Application published as WO2017/012635 describes synchronization for backhaul and fronthaul systems. Frequency synchronization is distributed using the inherent frequency of the physical layer carrying the frame where both CPRI traffic (and if applicable non-CPRI traffic) are mapped. The remote switch may embed a proper clock (e.g. according to EEC standard, G.8262/Y.1362 (01/15)) and may then forward the frequency synchronization via Synchronous Ethernet or via dedicate interfaces to the connected nodes. This is shown in FIG. 3. The Ethernet traffic could be either carried over the same lambda of the CPRI or over a separate lambda.

Hybrid fronthaul/backhaul (XHAUL) scenario is quite new therefore there are no established solutions addressing all related aspects related to time synchronization and latency monitoring. In particular, monitoring latency in networks is important, especially where this has a high impact on the performance and where the requirements are strict such as in fronthaul. TWAMP (or Two-Way Active Measurement Protocol) is being considered but traditional solutions do not include access to accurate time sync information, which results in lack of required accuracy (an accuracy in the sub-microsecond range).

SUMMARY

According to a first aspect of the present invention there is provided a method for use in a first node of a transport network for supporting latency monitoring in the transport network. The transport network transports traffic to and from at least one wireless base station. The transport network comprises the first node and a second node. The method comprises determining a first timestamp representing a time at which a data element is received at the first node and adding information representative of the first timestamp to a communication signal for sending to the second node. The communication signal carries data for the at least one wireless base station and the data includes the received data element. The method also comprises sending an indication of an association between the information representative of the first timestamp and the data element that the information representative of the first timestamp relates to.

According to a second aspect of the present invention there is provided a method for use in a second node of a transport network for supporting latency monitoring in the transport network. The transport network transports traffic to and from at least one wireless base station. The transport network comprises a first node and the second node. The method comprises receiving a communication signal which carries data for the at least one wireless base station, the data including a data element and extracting information representative of a first timestamp from the communication signal. The first timestamp representing a time at which the data element was received at the first node. The method also comprises receiving an indication of an association between the information representative of the first timestamp and a part of the communication signal that the information representative of the first timestamp relates to. The method also comprises determining a second timestamp representing a time at which the data element is received at the second node.

According to a third aspect of the present invention there is provided an apparatus for supporting latency monitoring at a first node of a transport network. The transport network transports traffic to and from at least one wireless base station. The transport network comprises the first node and a second node. The apparatus comprises a processing circuitry and a memory. The memory contains instructions executable by the processing circuitry such that the apparatus is operative to determine a first timestamp representing a time at which a data element is received at the first node and add information representative of the first timestamp to a communication signal for sending to the second node. The communication signal carries data for the at least one wireless base station, the data including the received data element. The apparatus is further operative to send an indication of an association between the information representative of the first timestamp and the data element that the information representative of the first timestamp relates to.

According to a fourth aspect of the present invention there is provided an apparatus for supporting latency monitoring at a second node of a transport network. The transport network transports traffic to and from at least one wireless base station. The transport network comprises a first node and the second node. The apparatus comprises a processing circuitry and a memory. The memory contains instructions executable by the processing circuitry such that the apparatus is operative to receive a communication signal which carries data for the at least one wireless base station, the data including a data element and to extract information representative of a first timestamp from the communication signal, the first timestamp representing a time at which the data element was received at the first node. The apparatus is further operative to receive an indication of an association between the information representative of the first timestamp and a part of the communication signal that the information representative of the first timestamp relates to. The apparatus is further operative to determine a second timestamp representing a time at which the data element is received at the second node.

According to a fifth aspect of the present invention there is provided an apparatus for supporting latency monitoring at a first node of a transport network. The transport network transports traffic to and from at least one wireless base station. The transport network comprises the first node and a second node. The apparatus comprises a timestamp determining module for determining a first timestamp representing a time at which a data element is received at the first node and a timestamping module for adding information representative of the first timestamp to a communication signal for sending to the second node. The communication signal carries data for the at least one wireless base station, the data including the data element. The apparatus also comprises a sending module for sending an indication of an association between the information representative of the first timestamp and the data element that the information representative of the first timestamp relates to.

According to a sixth aspect of the present invention there is provided an apparatus for supporting latency monitoring at a second node of a transport network. The transport network transports traffic to and from at least one wireless base station. The transport network comprises a first node and the second node. The apparatus comprises a first receiving module for receiving a communication signal which carries data for the at least one wireless base station, the data including a data element and an extracting module for extracting information representative of a first timestamp from the communication signal, the first timestamp representing a time at which the data element was received at the first node. The apparatus also comprises a second receiving module for receiving an indication of an association between the information representative of the first timestamp and a part of the communication signal that the information representative of the first timestamp relates to and a determining module for determining a second timestamp representing a time at which the data element is received at the second node.

According to a seventh aspect of the present invention there is provided an apparatus for supporting latency monitoring at a first node of a transport network. The transport network transports traffic to and from at least one wireless base station. The transport network comprises the first node and a second node. The apparatus is adapted to determine a first timestamp representing a time at which a data element is received at the first node and to add information representative of the first timestamp to a communication signal for sending to the second node. The communication signal carries data for the at least one wireless base station, the data including the received data element. The apparatus is further adapted to send an indication of an association between the information representative of the first timestamp and the data element that the information representative of the first timestamp relates to.

According to an eight aspect of the present invention there is provided an apparatus for supporting latency monitoring at a second node of a transport network. The transport network transports traffic to and from at least one wireless base station. The transport network comprises a first node and the second node. The apparatus is adapted to receive a communication signal which carries data for the at least one wireless base station, the data including a data element; and to extract information representative of a first timestamp from the communication signal, the first timestamp representing a time at which the data element was received at the first node. The apparatus is further adapted to receive an indication of an association between the information representative of the first timestamp and a part of the communication signal that the information representative of the first timestamp relates to and to determine a second timestamp representing a time at which the data element is received at the second node.

According to a ninth aspect of the present invention there is provided a transport network for transporting traffic to and from at least one wireless base station comprising a first node with an apparatus for supporting latency monitoring and a second node with an apparatus for supporting latency monitoring as disclosed above.

According to a tenth aspect of the present invention there are provided computer programs and a carrier containing the computer programs which, when executed in a first or a second node, cause the nodes to execute the respective methods disclosed above.

Further features of the present invention are as claimed in the dependent claims.

The present invention provides the benefit of allowing monitoring end-to-end latency in a transport network, with high accuracy (even with sub-microsecond accuracy) and limited overhead addition, particularly in embodiments using result of modulo operation as information representative of timestamps. The present invention is particularly relevant when latency sensitive services are transported, e.g. in fronthaul applications.

BRIEF DESCRIPTION OF THE DRAWINGS

The present invention will be understood and appreciated more fully from the following detailed description taken in conjunction with the drawings illustrating various aspects of embodiments in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
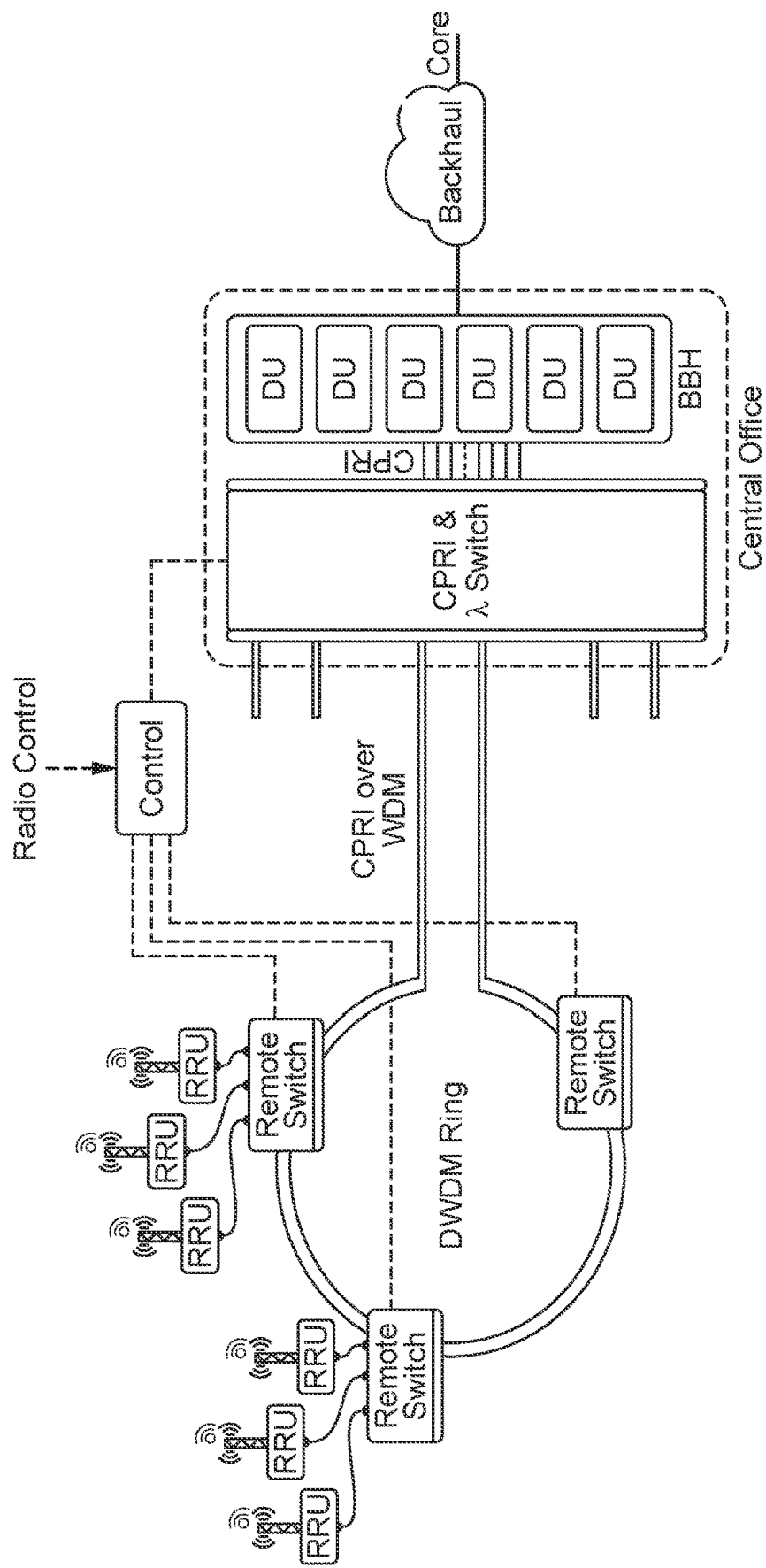
FIG. 1 is a diagram illustrating architecture of an optical fronthaul network.
Figure 2:
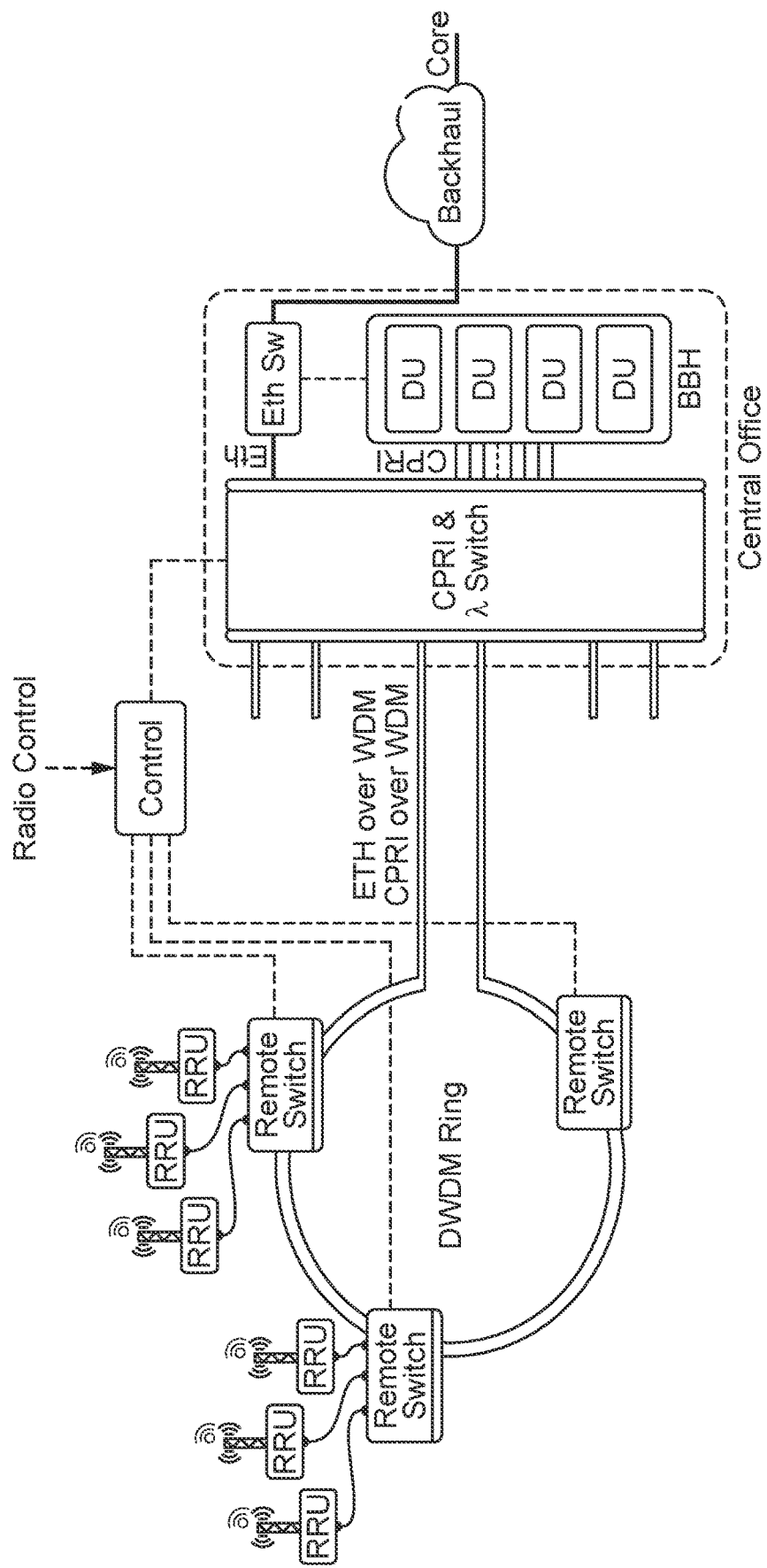
FIG. 2 is a diagram illustrating architecture of an optical XHAUL network providing fronthaul for RRUs and backhaul for RBSs.
Figure 3:
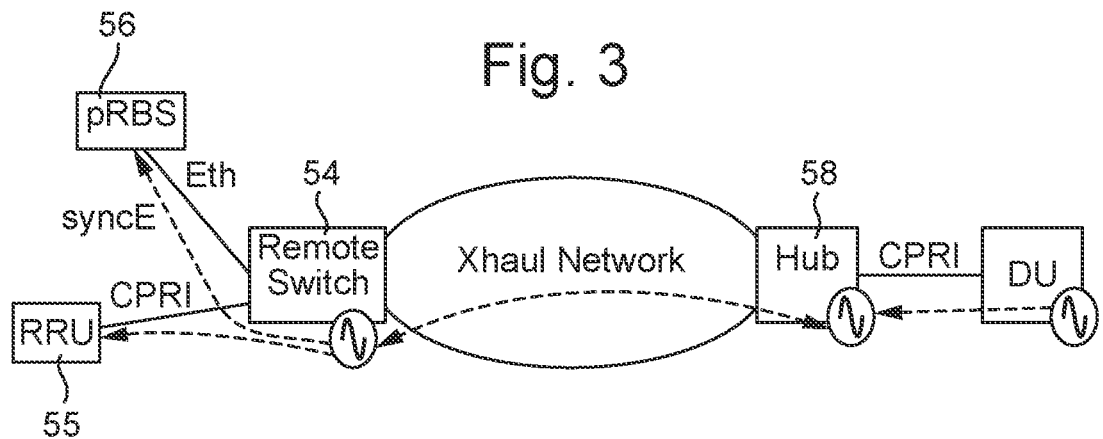
FIG. 3 illustrates frequency synchronisation in the network of FIG. 1.
Figure 4:
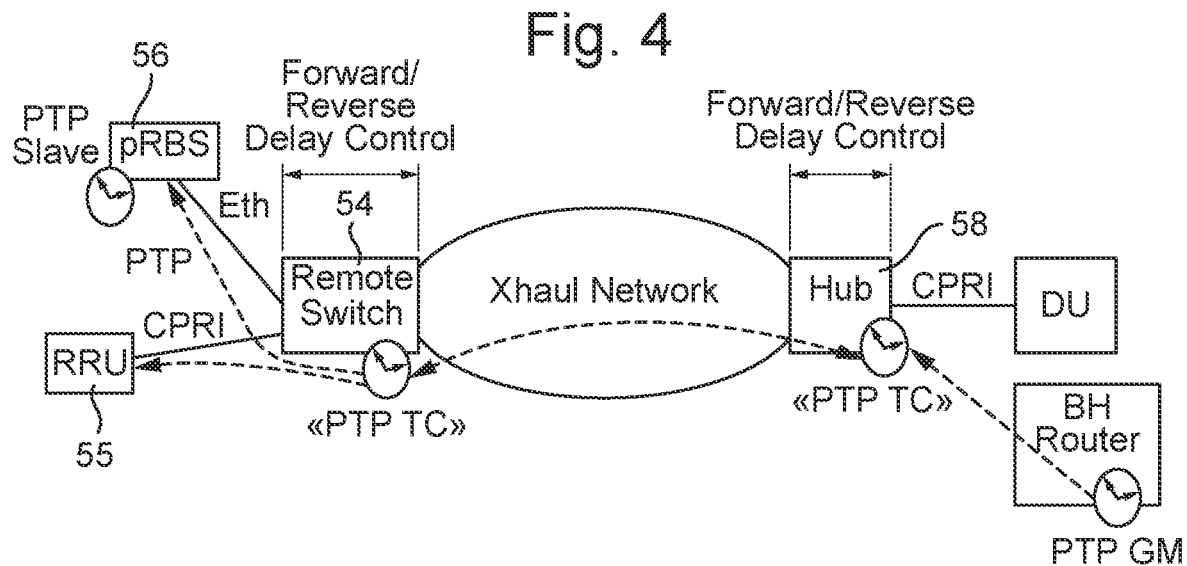
FIGS. 4 and 5 illustrate examples of phase/time synchronisation in the network of FIG. 1.

International Patent Application publication WO2017/012635 describes two main options for distributing timing to remote nodes:

A. PTP (Precision Time Protocol) as client traffic or in the overhead transparently delivered over the common frame used for CPRI and Ethernet traffic, as shown in FIG. 4.

B. Set up of a specific timing protocol over the shared frame, as shown in FIG. 5.

Figure 5:
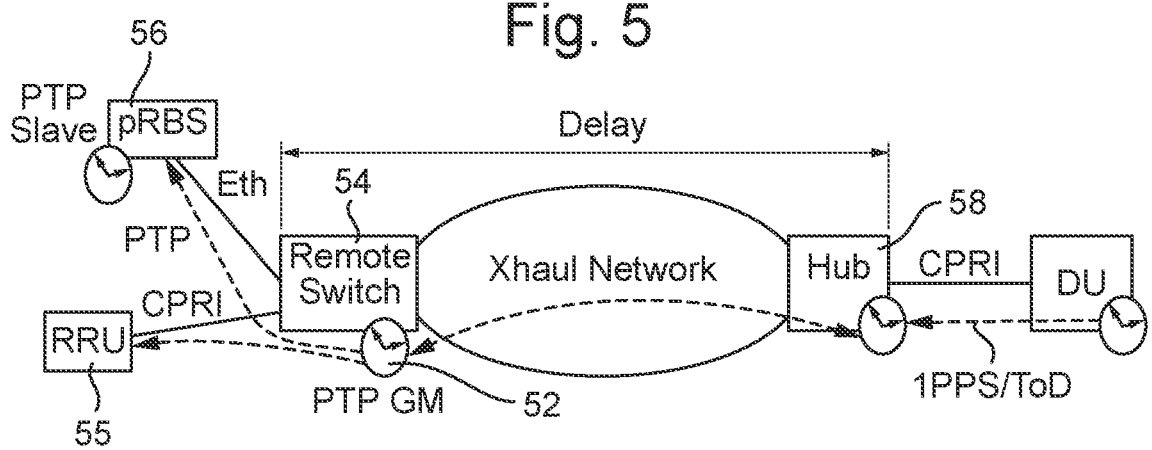

In the solution illustrated in FIG. 5 a common accurate timing is provided to backhaul and fronthaul systems by means of a specific timing protocol over the shared frame. In this case, the remote switch, 54, implements a simple PTP GM (grandmaster), 52, that synchronizes the connected pRBSs (pico-RBS), 56. The time information may comprise phase and time of day (ToD). The solution allows for redundant architecture, e.g., in a ring based network, timing can be rearranged in case of network failures. Redundant master can also be deployed in order to protect against sync master failures.

Figure 6:
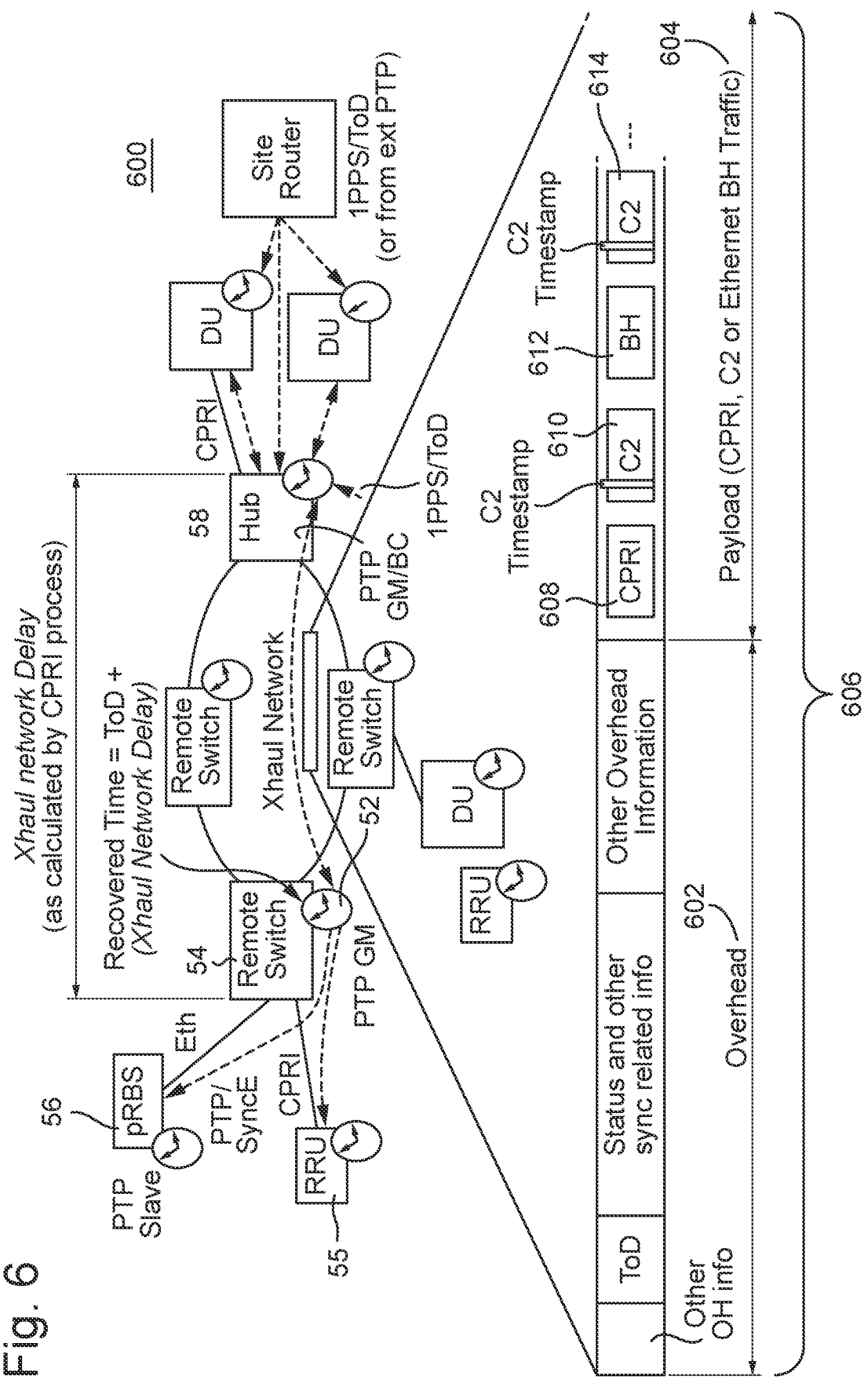
FIG. 6 illustrates a transport network implementing a method for supporting latency monitoring.

FIG. 6 shows a solution based on FIG. 5. It can be implemented by allocating some bits (ToD) to carry the timestamps carrying the current time reference at the Hub, plus bits implementing a 2-way protocol (as per IEEE 1588 peer delay mechanism). In particular, the following main information is sent:

Unidirectional Information on the status (replicating the information carried by the Announce messages in PTP). This could be based on the "Time Announce Message" defined by G.8271/Y.1366 ver. 07/2016 (see table A.4). This consists of 30 bytes and according to G.8275.1 ver. 06/2016 can be sent once every ⅛ seconds (i.e. 1.9 kbps).

Unidirectional Information carrying the current Time. This can be based on the Time Event Message as defined by G.8271/Y.1366 ver. 07/2016 (see table A.3). It consists of 14 bytes and is sent once every ¹⁄₁₆ seconds, i.e. 1.8 Kbps.

Figure 8:
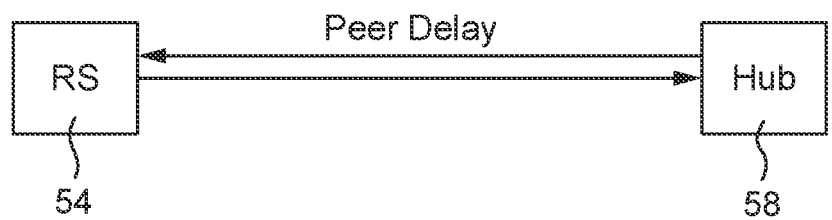
FIG. 8 illustrates peer delay messaging used to evaluate link delay.

Bidirectional protocol for peer delay messaging (see FIG. 8). G.8271/Y.1366 does not specify specific messages for that. However, the basic information could be based on the peer delay request and response messages as defined by IEEE1588, i.e. 10 bytes. Note, as communication is specific towards a single Remote Switch (RS), 54, there is no need to add "address" information. This information could be exchanged with a relatively slow rate (e.g. 1 per second, with a total of 80 bits per second in this case).

The overall capacity required is in the order of 4 kbps.

In an alternative approach a transparent clock in Hub, 58, and Remote Switch, 54, can be used as defined by the IEEE 1588 standard.

FIG. 8 shows peer delay messaging to evaluate the link delay.

The solutions allow to have access to an accurate time sync reference (in the sub-microsecond accuracy) at all Remote Switches.

According to one solution, the clients carry their own timestamps, the clients are represented in FIG. 6 as the packets, 608-614, located in the payload, 604, section of the frame 606. As an example, in case of packet based fronthaul (C2), a timestamp is being considered to be carried in the mapped C2 frame. A contribution "RoE timestamp and presentation time in past", by Jouni Korhonen to IEEE 1914.3 draft standard has proposed a 16 ms periodic timestamp that is sufficient to schedule the data on the 10 ms radio frame and that can be sufficient in a fronthaul network with hundreds μs (microseconds) max delay, see FIG. 7. The above contribution can be found here: http://sites.ieee.org/sagroups-1914/files/2016/07/tf3_1606_korhonen_pastts_1.pdf. The C2 packets are defined in eCRPI standard published in http://www.cpri.info/downloads/eCPRI_v_I_0_2017_08_22.pdf.

Various formats of timestamps have been defined to carry time sync information. As an example, the IEEE 1588 ver. 2008 uses the following data type for a timestamp:

struct Timestamp
{UInteger48 secondsField;
UInteger32 nanosecondsField};

The secondsField member is the integer portion of the timestamp in units of seconds. The nanosecondsField member is the fractional portion of the timestamp in units of nanoseconds. The nanosecondsField member is always less than $10^9$. Fractional nanoseconds cannot be represented in the IEEE 1588 Timestamp data type illustrated above and are transmitted in a correctionField, leaving it to the receiving device to combine the two to get the actual timestamp (8 octets).

The Timestamp data type represents a positive time with respect to the epoch.

Figure 7:
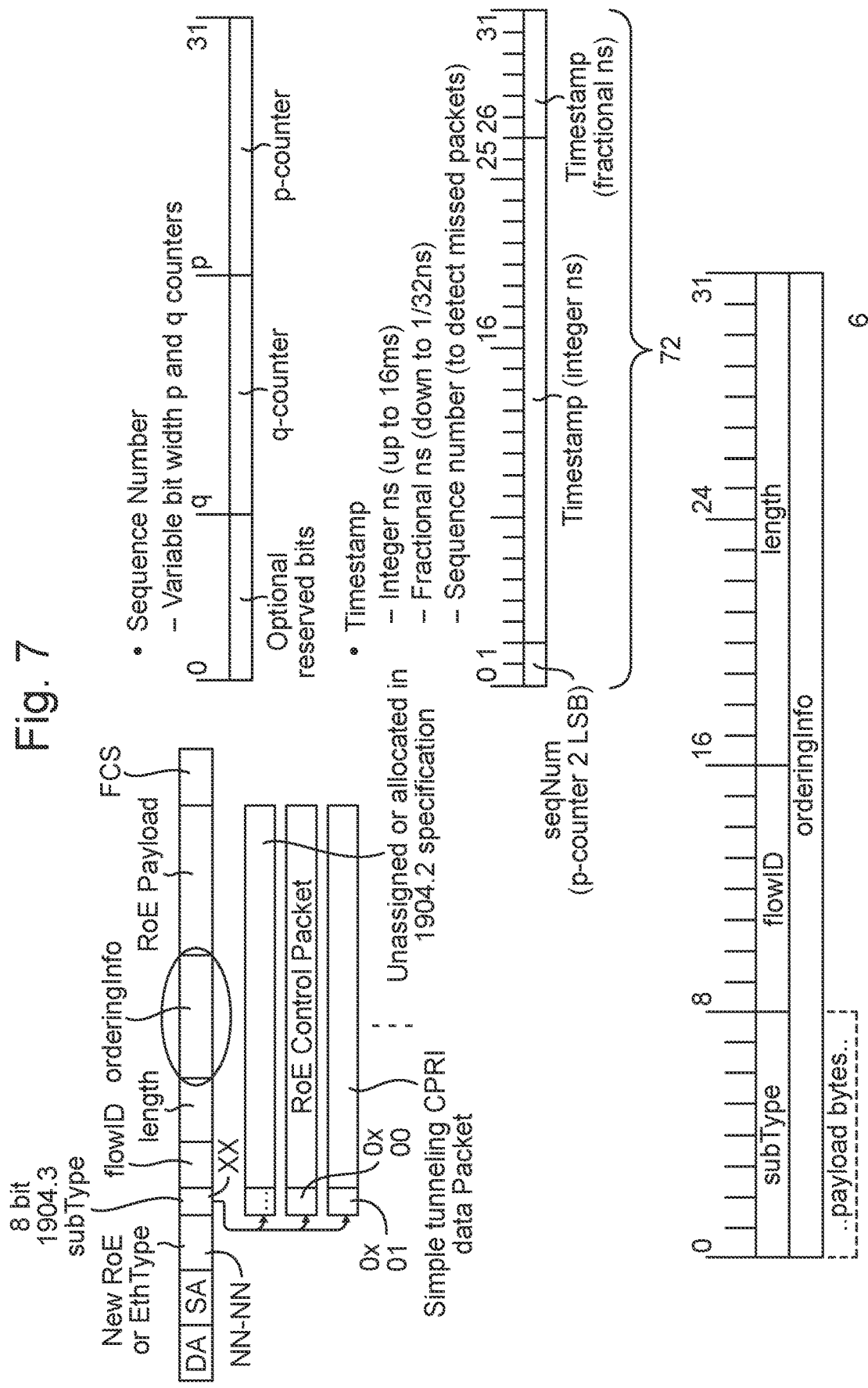
FIG. 7 illustrates a timestamp associated with a mapped client as defined in draft IEEE 1914.3.

In IEEE 1904.3 (now draft IEEE 1914.3) a specific timestamp associated with the mapped client is being defined. 30 bits are allocated for the actual timestamp, 72, as illustrated in FIG. 7.

Availability of accurate time sync across the network, which can be achieved by distributing time information (or timestamps) as described above, can be exploited for accurate latency measurements on the clients. Various options are possible.

Figure 14:
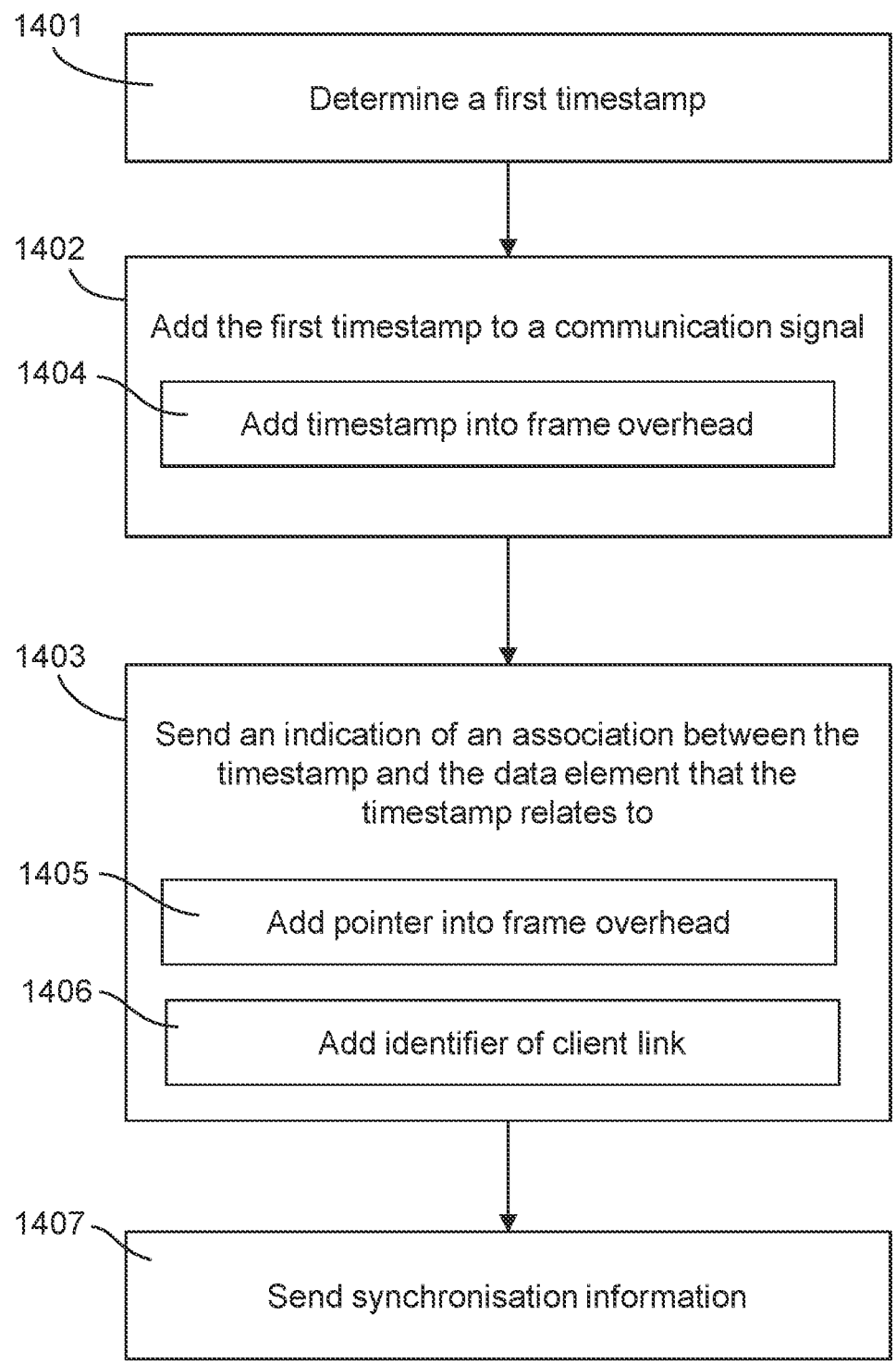
FIG. 14 illustrates an embodiment of a method for use in a first node of a transport network for supporting latency monitoring in the transport network.

FIG. 14 shows an embodiment of a method of supporting latency monitoring in a transport network. The transport network, 600, illustrated in FIG. 6, is for transporting traffic to/from at least one wireless base station, 56. The method is performed at a first node, 58, of the transport network, 600. The method comprises an operation of determining, 1401, a first timestamp representing a time at which a data element is received at the first node, 58. The method comprises adding, 1402, the first timestamp to a communication signal which carries data for the at least one wireless base station, the data includes the data element. The method in this embodiment also comprises sending, 1403, an indication of an association between the timestamp and the data element that the timestamp relates to. In a preferred embodiment, the operation of sending, 1403, comprises sending the communication signal comprising an indication of the association between the timestamp and the data element that the timestamp relates to.

In a preferred embodiment the communication signal may comprise a frame, 606, with an overhead, 602, and a payload, 604. In one embodiment the method may add, at step 1404, the timestamp into the overhead part of the frame. Alternatively, the timestamp may be added to the payload, 604. In this alternative embodiment, preferably, the timestamp is sent in every C2 packet as it is used by the RRU, 55, to reconstruct the timing when data has to be delivered over radio interface.

Figure 13:
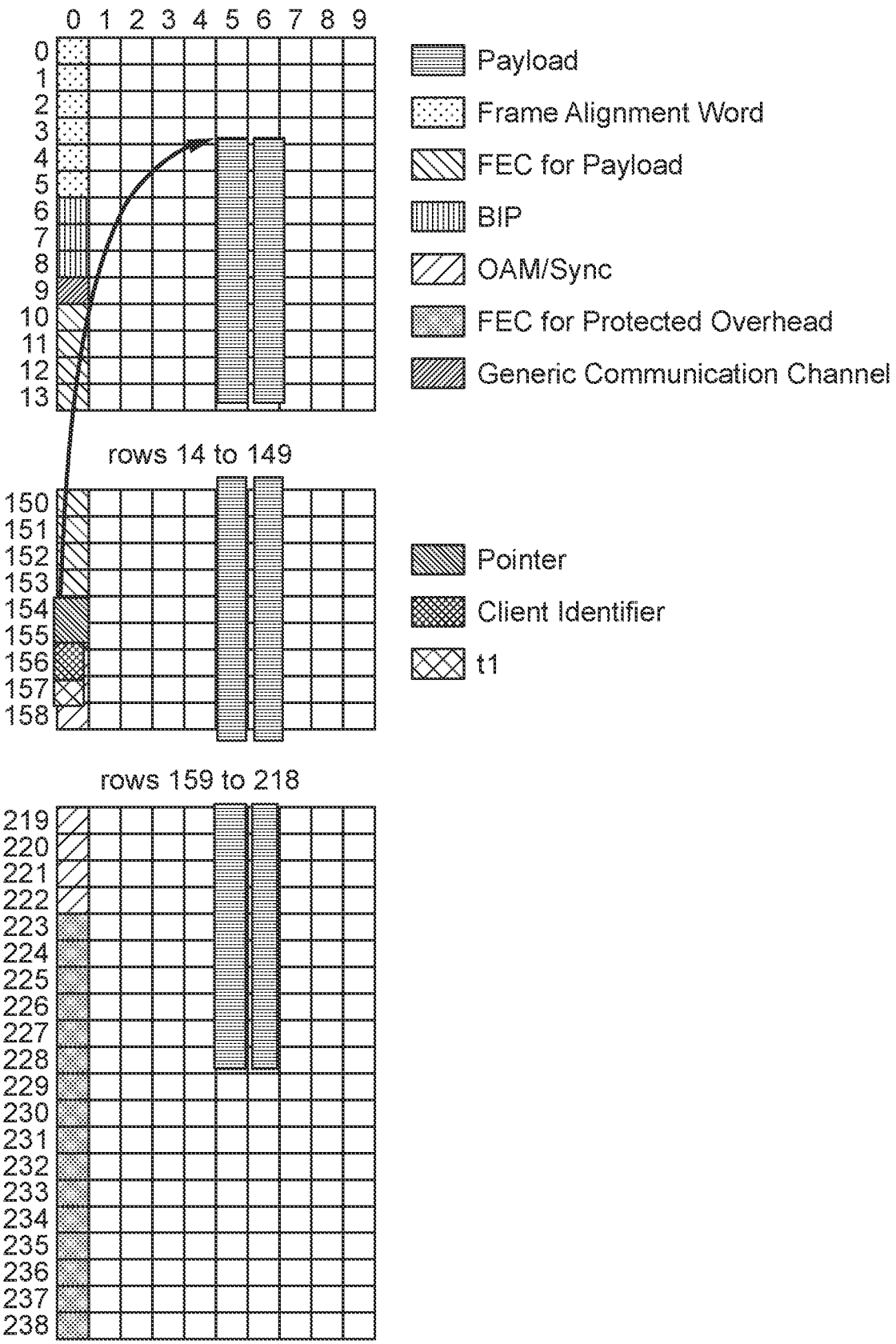
FIG. 13 illustrates a frame structure carrying information used in latency monitoring.

In one embodiment the indication of an association may be a pointer, and the method may, at 1405, add the pointer to an overhead part of the communication signal, the pointer pointing to a part of the payload where the timestamped data element (e.g. timestamped packet) is carried. The method may add an identifier, 1406, of a client link carried by the frame. The identifier indicates the client link that the timestamp relates to. One possible embodiment is illustrated in FIG. 13. All the timestamp information is in column 0, while the long rectangles in column 5 and 6 (but they could be also in other columns except in column 0) illustrate the packet being timestamped. Note that the packets are sent in the payload as we are using here a Time Division Multiplexed scheme to carry different clients. A single cell in the frame structure illustrated in FIG. 13 corresponds to one byte of information. The information that is carried in column 0 for timestamping is divided into three fields:

1) A pointer to the payload that indicates where the timestamped packet begins, rows 154 and 155,
2) An identifier specifying which client link the monitored packet belongs to, row 156)
3) The actual timestamp (row 157) that could be spread over more than a frame in the same position, as the timestamp occurs only a few times per second, while the frame periodicity is less than 2 microseconds. So, there could be the first byte of $t_1$ in frame n, then the second in frame n+1 and so on. In alternative embodiments, information representative of a timestamp may be carried in column 0, row 157, e.g. result of a modulo operation performed on timestamp values as described in the embodiments to follow.

The method may send, 1407, synchronisation information. The synchronisation allows a second node (remote from the first node) to determine an accurate time of receipt of the data element, and therefore determine an accurate measure of latency. The synchronisation information may comprise at least one of: an indication of time of day; peer delay messaging as specified in IEEE 1588 ver. 2008; an indication of status (traceability, fault, etc.).

Figure 15:
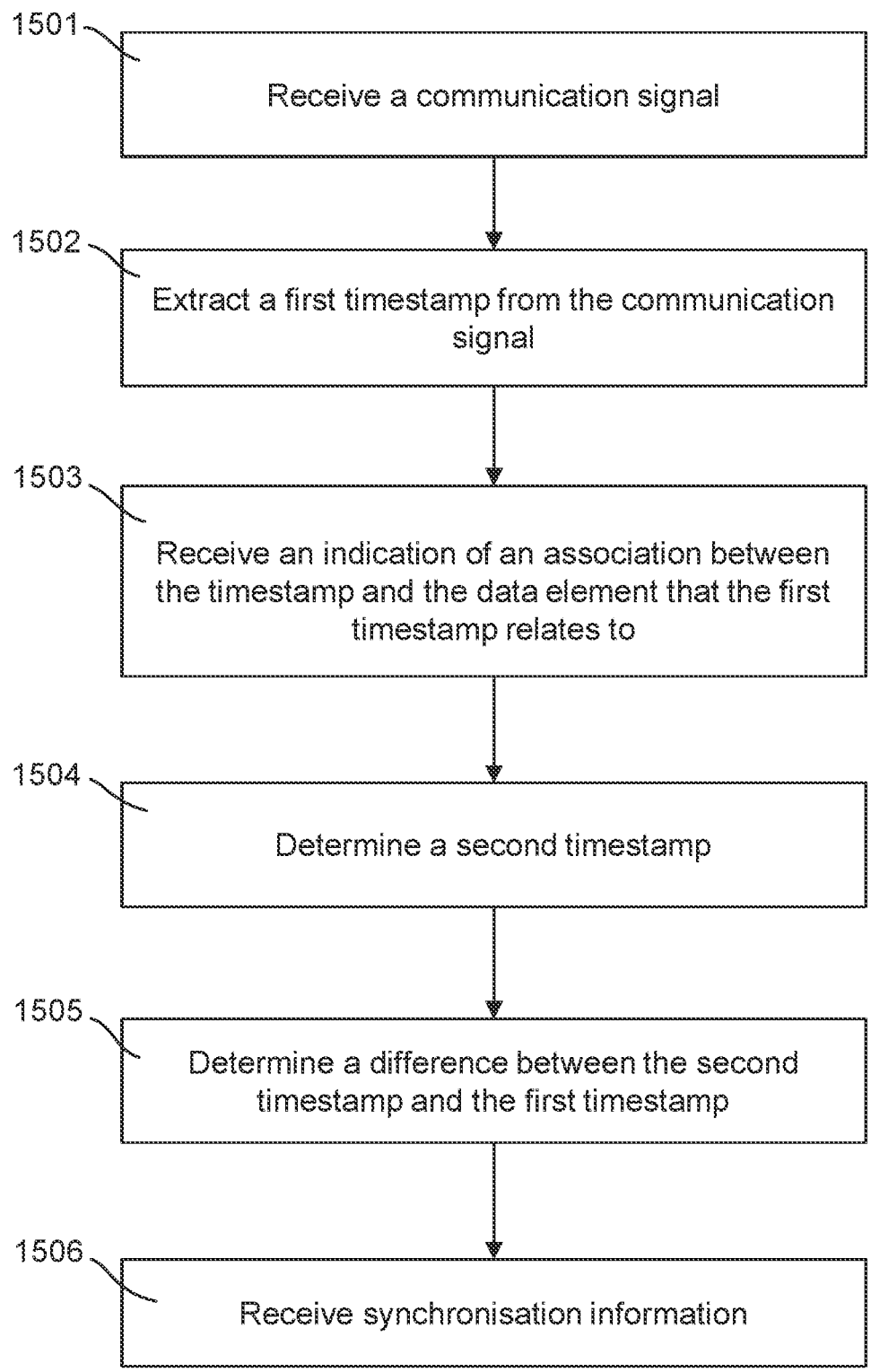
FIG. 15 illustrates an embodiment of a method for use in a second node of a transport network for supporting latency monitoring in the transport network.

The above description described explained an embodiment of the method from perspective of the first node, 58. FIG. 15, on the other hand, illustrates embodiment of the method as implemented at the second node, 54, which is remote from the first node, 58.

FIG. 15 shows an embodiment of a method of supporting latency monitoring in a transport network, 600. The transport network is for transporting traffic to/from at least one wireless base station, 56. The transport network, 600, comprises a first node, 58, and a second node, 54. The method in this embodiment is performed at the second node, 54. In a preferred embodiment the method comprises receiving, 1501, a communication signal which carries data for the at least one wireless base station, 56. The data includes a data element. The method comprises extracting, 1502, a first timestamp from the communication signal. The first timestamp represents a time at which the data element was received at the first node, 58. The method comprises receiving, 1503, an indication of an association between the first timestamp and the data element that the first timestamp relates to. The method also comprises determining, 1504, a second timestamp representing a time at which the data element is received at the second node.

In a preferred embodiment the method comprises determining, 1505, a difference between the second timestamp and the first timestamp, the difference representing latency of the data element.

The method may receive 1506 synchronisation information. The synchronisation information allows the second node to determine an accurate time of receipt of the data element, and therefore determine an accurate measure of latency. One embodiment is the PTP GM procedure mentioned earlier. The synchronisation information may comprise at least one of: an indication of time of day; peer delay messaging; an indication of status.

The method may extract the first timestamp from an overhead part of the communication signal or from the payload in an alternative embodiment. As explained earlier, the indication of an association may comprise a pointer in an overhead part of the communication signal, the pointer pointing to a part of the payload where the timestamped data element is carried.

In one embodiment the indication of an association may be received in advance of the first timestamp.

The communication signal may be a signal for carrying fronthaul data and backhaul data. In preferred embodiment the communication signal may comprise a frame with an overhead and a plurality of payload areas into which signals/data can be mapped, the payload areas comprising one or more of: a payload area for carrying Common Public Radio Interface, CPRI, signals, a payload area for carrying Ethernet signals, a payload area for carrying C2 signals.

In one embodiment of the method when implemented in a network a specific packet is timestamped at the entrance of the XHAUL network (packet timestamp $t_1$) and then the same packet is timestamped at the exit of the XHAUL network (packet timestamp $t_2$). The method then comprises associating these timestamps ($t_1$ and $t_2$) to an identifier of the specific packet that has been timestamped is one first possibility. A possible identifier could be a client timestamp TSi assuming this is unique per packet. In general, TSi may indicate a predefined time instant when the data (i.e. packet timestamped with TSi) has to be presented at a certain point in the network. Implementation of the TSi timestamp is not fully standardized, eCPRI leaves the details to individual vendor implementation and the draft IEEE 1914.3 assumes that the TSi timestamp can be associated to each packet indicating when packet needs to be delivered over the radio interface.

Figure 10:
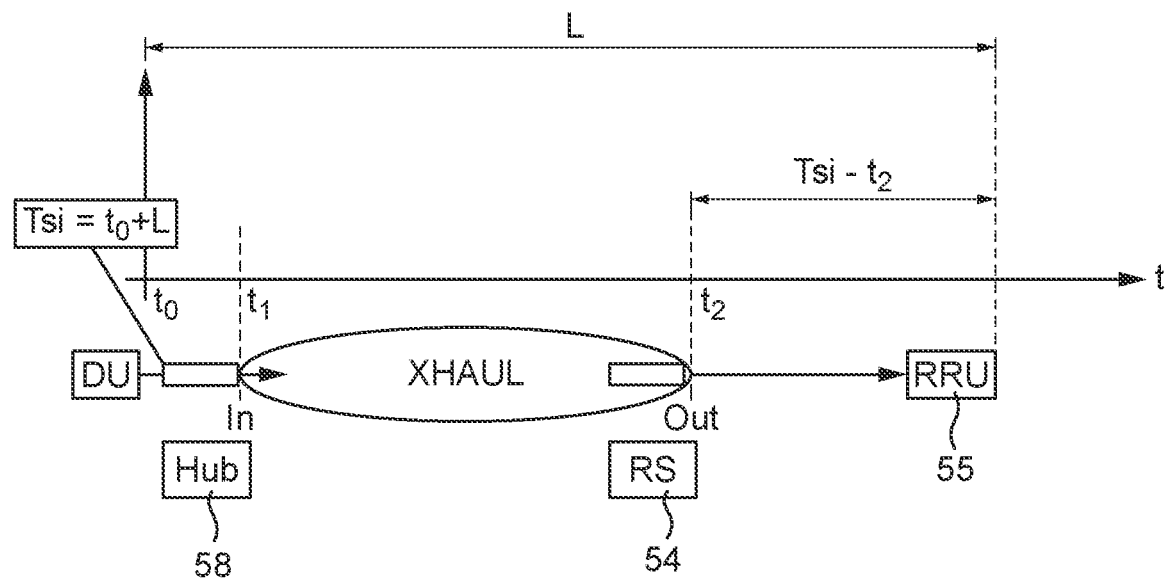
FIG. 10 illustrates an embodiment of calculating latency.

As shown in FIG. 10, the instant of time "$t_1$" when the packet carrying the client data is entering the Hub, 58, is carried in the in the XHAUL OH (OH=overhead, in a position associated with the specific client).

The embodiments described based on timestamp values (first timestamp and second timestamp) may be modified by using information representative of a timestamp. In one embodiment the information representative of a timestamp may be the timestamp itself as in the embodiments already described. In an alternative embodiment the information representative of a timestamp may be result of a modulo operation performed on the values of the timestamps.

In one advantageous embodiment modulo 16 (16 ms, milliseconds) value of the timestamp (e.g. $t_{1mod16ms}$, $t_{2mod16ms}$, etc) may be used similarly to the actual timestamp of the client (assuming that the network would not allow for latency larger than 16 ms). The advantage of using modulo 16 calculated from a timestamp instead of the timestamp itself is that the modulo value is much shorter that the timestamp. For modulo 16 it will be integer values from 0 to 15. This, in turn, allows for reducing the amount of data transmitted in order to determine latency in various embodiments of this invention. In calculating the modulo value it is the value of 16 taken and not the unit (milliseconds), but in order to illustrate the relation between these operations and the time domain a notation is used showing the unit, ms, as in the equation (1) below.

In an alternative embodiment, in latency measurement other modulo values may be used, based for example on 14 ms, 18 ms or 23 ms, or some other values (i.e. mod14, mod18, mod23, etc).

As mentioned earlier, the use of modulo 16 works under the assumption that the network would not allow for latency larger than 16 ms. Of course this limit may be different in embodiments using different modulo values as discussed above. If there is no such limitation (i.e. the network allows for larger latency than the one used in the modulo value) then a larger space in the packet for transmission of the timestamp information will be required (i.e. more bits), when the actual timestamps will be transmitted instead of their modulo values.

Using modulo values instead of actual values of timestamps (e.g. $t_1$ and $t_2$) is an advantageous embodiment as it reduces the amount of data to be transmitted and simplifies its format, but is not essential for the operation of this invention.

Therefore, in embodiment, to calculate latency modulo 16 ms value of a timestamp at the Hub, 58, i.e. $t_{1mod16ms}$ is compared with the analogous value measured at the remote switch, 54 ($t_{2mod16ms}$) and the difference is the actual latency:

$$\text{Latency} = t_{2mod16ms} - t_{1mod16ms} \quad (1)$$

Still, the latency may also be calculated as $t_2 - t_1$.

When implemented in a network sufficient granularity, or time measurement resolution, for carrying the timestamp data in a packet (the number of bits used for the timestamp information) must be provisioned to get sub microsecond precision.

As mentioned earlier, it is assumed that the specific packet being monitored is identified at both ends of the network; e.g. the value $t_1$ produced at the first node, 58, is carried associated to a specific parameter that is unique per packet (e.g. sequence number, timestamp TSi if this is unique per packet so that can be used as a packet identifier) and is compared with the instant $t_2$ related to the exit of the same frame at the remote end, i.e. at the second node, 54.

Figure 9:
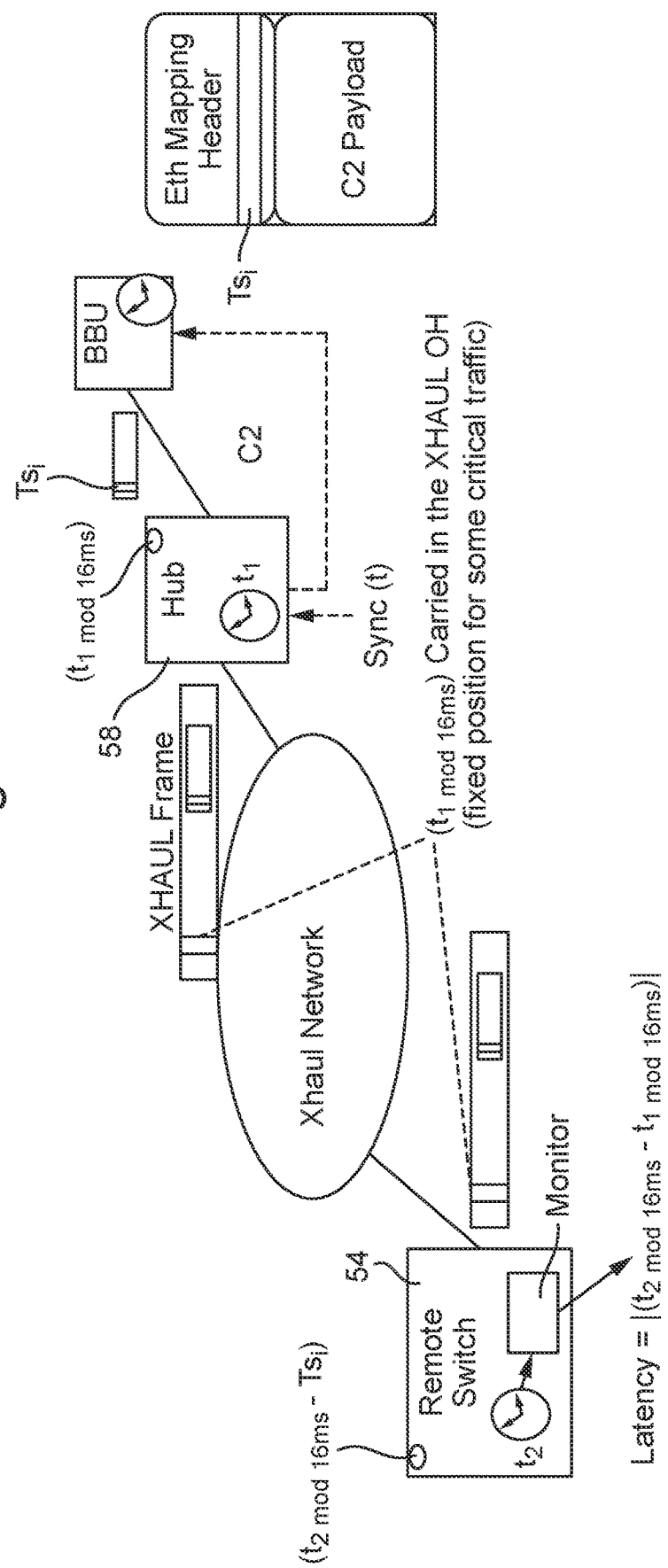
FIG. 9 illustrates an embodiment of latency monitoring at the Hub/Remote Switch.

FIG. 9 shows delay monitoring at the Hub/RS (i.e. first node 58 and second node 54). This solution is applicable to any packet-based client for which there is a need to monitor the latency (for example, but not necessarily, C2). A centralized entity may be involved (e.g. NMS controller) in the collection and analysis of the monitoring data $t_1$ and $t_2$.

In an alternative embodiment the timestamping information could be collected and analyzed by the Hub (for both directions latency measurements). The timestamps $t_1$ and $t_2$ are generated separately by the two nodes (Hub and RS). Only when these two timestamps are available the information is collected and analysed by the Hub or NMS.

As a special solution, illustrated in FIG. 10. In this scenario the TSi has a direct relationship with an absolute time $t_0$, i.e.

$$TSi = t_0 + L, \quad (2)$$

where $t_0$ is the time instant the packet is transmitted by the DU (Digital Unit) and L is the length of time a packet has for reaching its destination, i.e. output of the RRU. From FIG. 10 we can see that the time period a packet needs to travel from the remote switch to the RRU output, $T_{RS\text{-}RRU}$, can be calculated as:

$$T_{RS\text{-}RRU} = TSi - t_2 \quad (3)$$

This is important because there are no elements between the remote switch and the RRU, so the transit time from the remote switch to the RRU will be constant and in consequence the latency can be approximated as:

$$\text{Latency} \approx L-(TSi-t_2) \quad (4)$$

and if we substitute TSi with the expression from (2) we arrive at:

$$\text{Latency} \approx L-(t_0+L-t_2)=t_2-t_0 \quad (5)$$

where for a scenario as illustrated in FIG. 10, we approximate $t_0 \approx t_1$. This is true in practical implementations where the distance from DU (Digital Unit) to the Hub (where $t_1$ timestamp is applied) is small compared to the remaining distance to the RRU.

This special solution may imply some constraints in the TSi specification (e.g. that the TSi must be directly related to the absolute time when a packet is delivered).

Additional deployment scenarios, independent of the specific XHAUL architecture are also possible.

Figure 11:
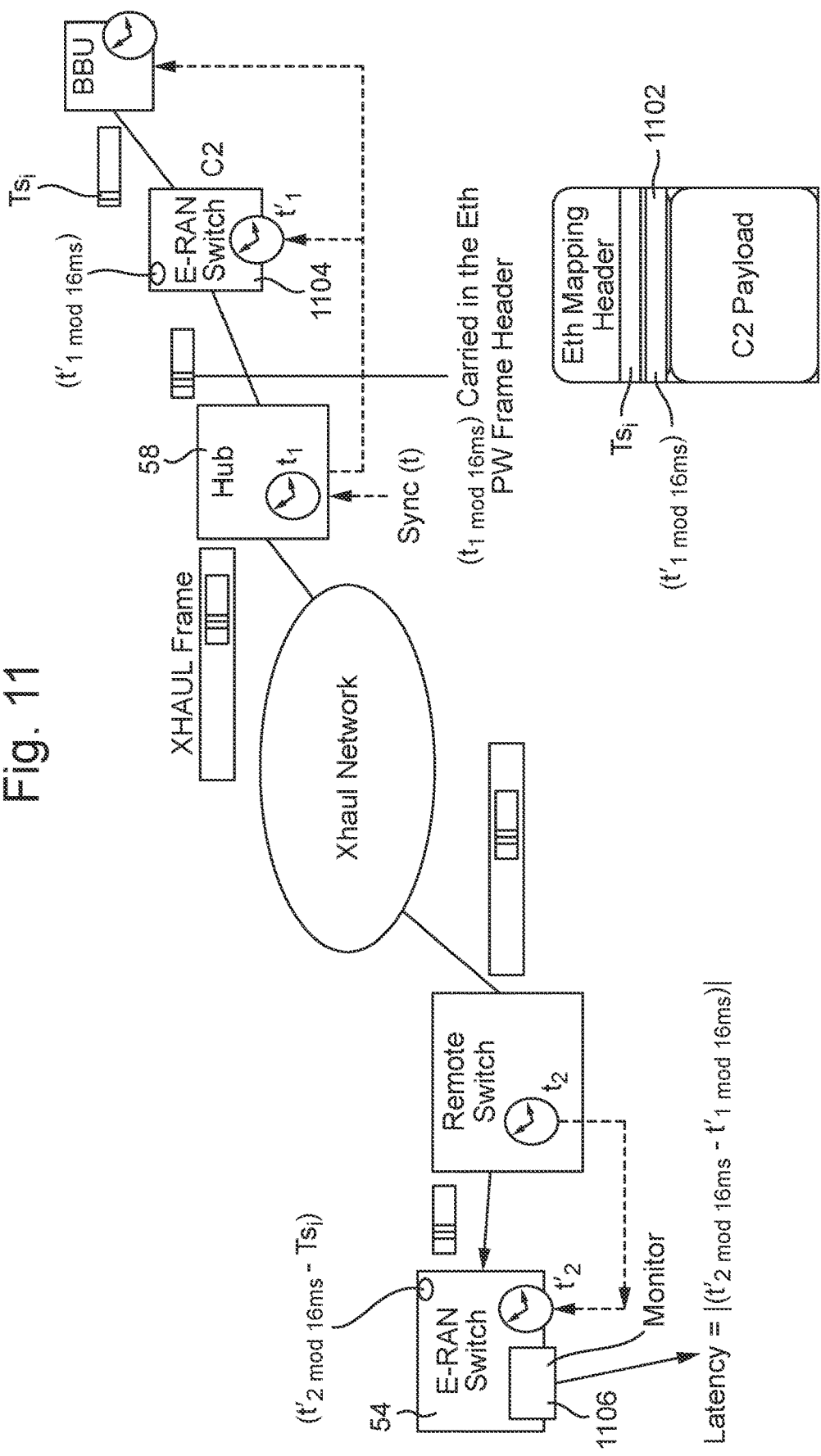
FIGS. 11 and 12 illustrate alternative embodiments of latency monitoring in a transport network.

As an example, when local switches, 1104 and 1106, are implemented, the latency evaluation could be done including also these additional network elements, see example in FIG. 11 (example with E-RAN switch). This require some messaging channel in the C2 mapping Header (indicated by field 1102 in FIG. 11). Also in this embodiment the measurements could be collected in a centralized node or at the E-RAN switch in the Hub site.

One possible drawback is that this approach would imply a standardization impact (for defining the additional fields to be used for the monitoring function), unless further constraints are given to the TSi semantic (see for instance special solution described above with reference to FIG. 10 where the instant of time when TSi is inserted is predefined) so that there is no need to insert the additional $t_1$ timestamp.

Figure 12:
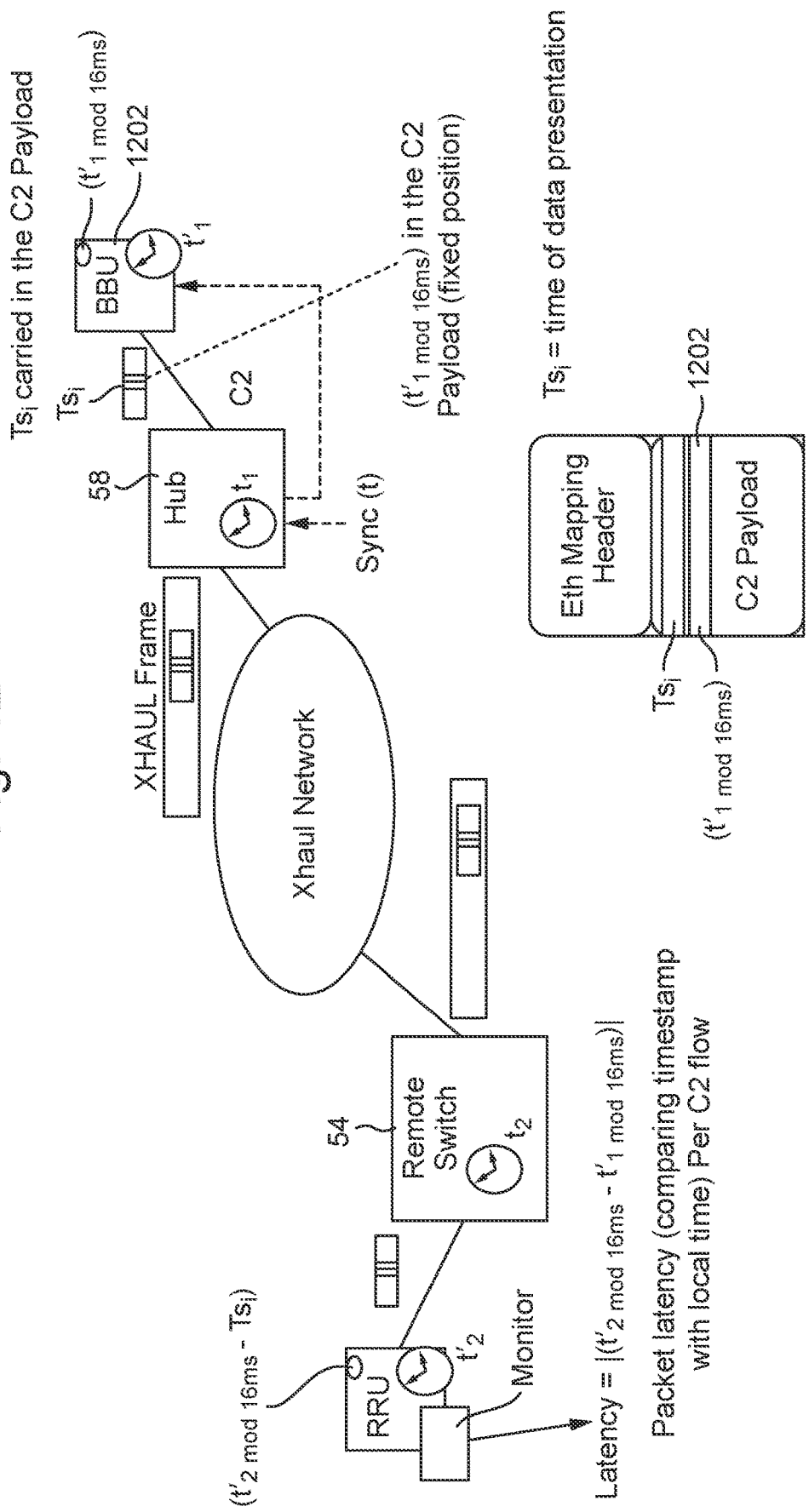

Finally, the monitoring function may also be fully done within the radio domain by the BBU/RRU pair, 1202 and 1204, as shown in FIG. 12.

In this case, the timestamp TSi could be just be part of the C2 Payload (see field "TSi" in the Eth mapping header of FIG. 11).

The C2 payload in addition to carry the Timestamp, could also be used to carry the actual timestamp to be monitored ($t_1$, see field 1202 in FIG. 12). Also in this case it could be Tsi itself.

One drawback with this set up is that it may not provide a monitoring function in the transport domain (clear demarcation point between radio and transport).

Further implementation details for the solution of FIG. 6.
The following data is transported:
TOD
Packet timestamp ($t_1$)
Identifier/pointer of the packet being monitored The Time Division Multiplexing based framing, as presented in WO2016/138950 associates a specific portion (that is an integer fraction) of the link bandwidth to a specific client. A fixed portion of the link bandwidth is not used for client payload but is dedicated to a service channel that is used to carry auxiliary information including, but not limited to, Forward Error Correction code-words (if used), in-band Operation and Maintenance (OAM) channel, quality monitoring functions (BIP, or bit-interleaved parity), frame alignment and frame numbering (in a multi-frame scheme). A small percentage of this service channel bandwidth can be allocated to carry timestamp information associated to a specific packet as described in the present solution. The needed information is:

An identifier of the client link to whom the monitored packet belongs (generally a few tens of clients can be expected, e.g. 8 bits max would be sufficient); this may not need to be carried in every frame but only when the timestamping actually happens e.g. every second per client.

The position in the frame where the monitored packet starts (e.g. 12 bits if less than 4K bytes needs to be identified); this may not need to be carried in every frame but only when the timestamping is actually performed e.g. every second per client (a default value could indicate that there is no packet to be timestamped, e.g. all ones).

The timestamp associated with that packet that is univocally individuated ($t_{1\,mod16ms}$ described above); this can be carried over multiframes depending how often the timestamping is implemented, e.g. every second per client.

At the receiving side, the time instant when the packet is ready to be transmitted towards the client (extracted from the TDM frame) is measured, leading to obtaining $t_{2\,mod16ms}$ value that can be compared with $t_{1\,mod16ms}$ extracted by the frame service channel to perform the latency monitoring function.

Figure 16:
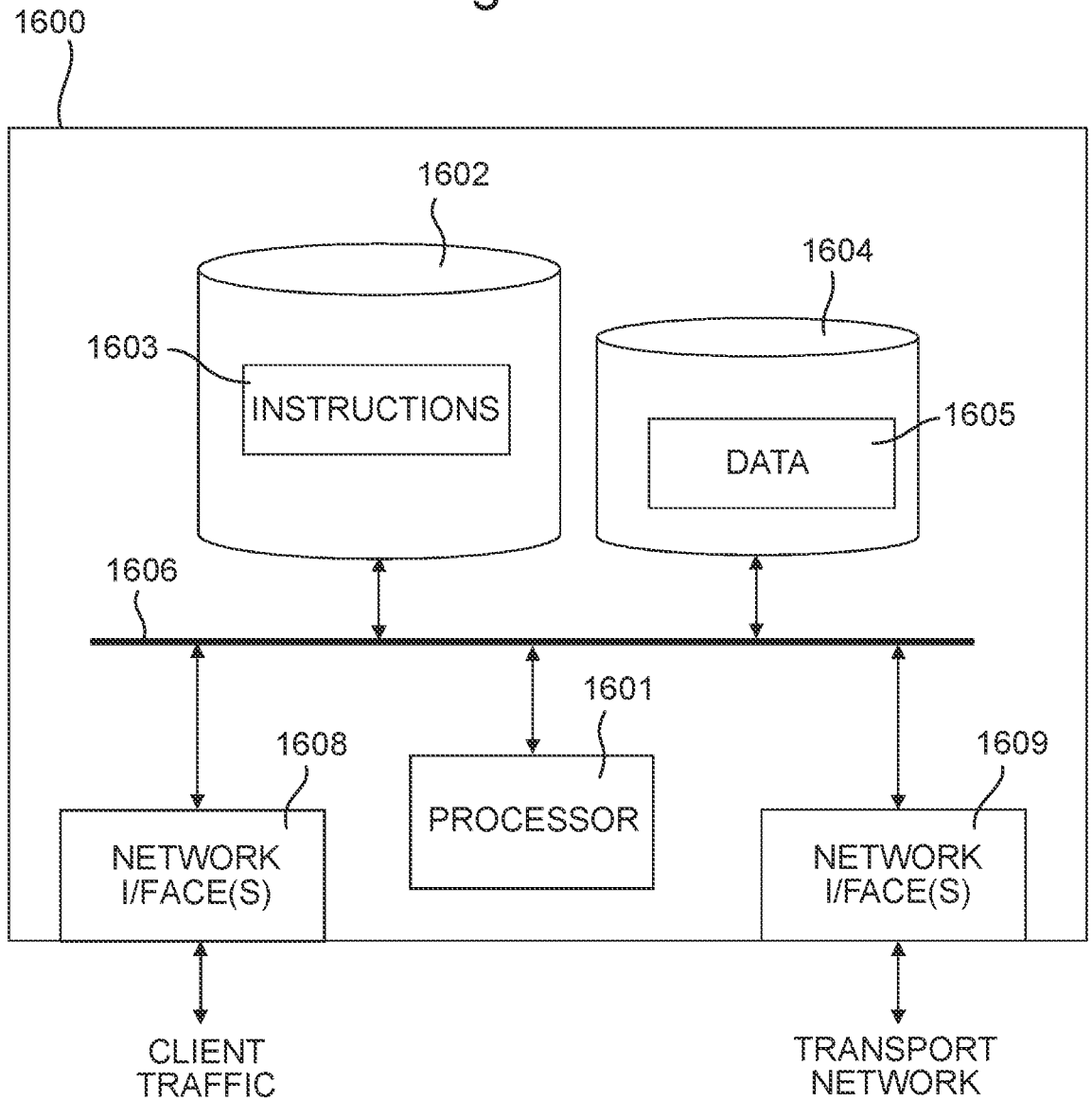
FIG. 16 illustrates an embodiment of an apparatus for supporting latency monitoring at a first node of a transport network.

FIG. 16 shows one embodiment of an apparatus, 1600, for supporting latency monitoring at a first node of a transport network. The transport network is illustrated in one embodiment in FIG. 6. The transport network, 600, transports traffic to/from at least one wireless base station, 56. The apparatus comprises a processing circuitry, including one or more processors, 1601, and a memory, 1602. The memory contains instructions, 1603, executable by the processing circuitry, 1601. The apparatus, 1600, is operative to determine a first timestamp representing a time at which a data element is received at the first node, 58. The apparatus, 1600, is operative to add the first timestamp to a communication signal which carries data for the at least one wireless base station, 56, the data including the data element. The apparatus, 1600, is operative to send an indication of an association between the timestamp and the data element that the timestamp relates to. The apparatus, 1600, comprises one or more network interfaces, 1608, for interfacing with other network entities, such as links which carry client traffic. The apparatus, 1600, comprises one or more network interfaces 1609 for interfacing with the transport network, 600.

In the embodiment illustrated in FIG. 16 the interfaces, 1608 and 1609, processor, 1601 and memory, 1602 and 1604 are connected to a bus, 1606, however, other architectures of the apparatus, 1600, are also possible and would be envisaged by those skilled in the art. For example, the processor, memory modules and interfaces could be connected in series.

Figure 17:
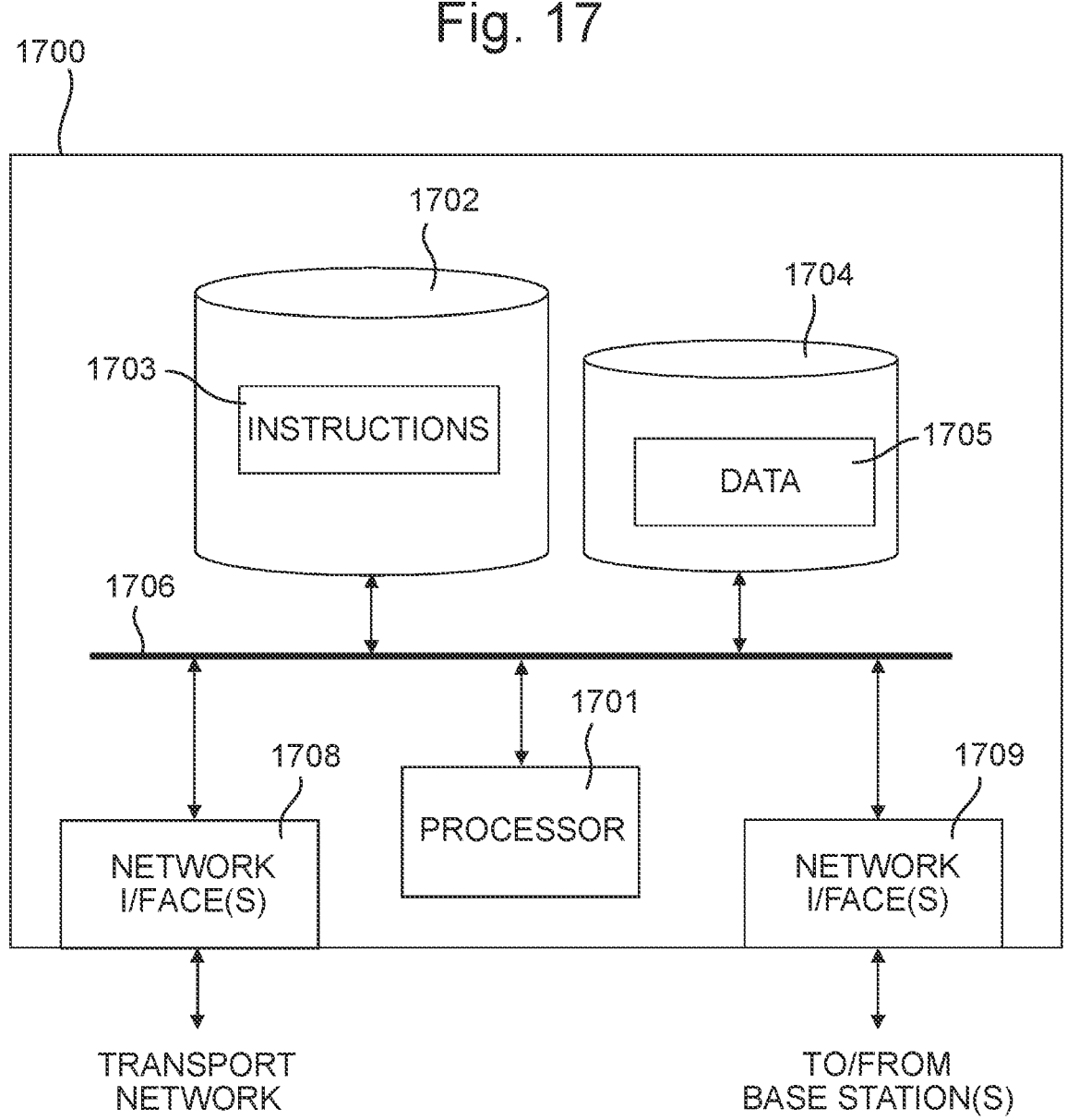
FIG. 17 illustrates an embodiment of an apparatus for supporting latency monitoring at a second node of a transport network.

FIG. 17 shows one embodiment of an apparatus, 1700, for supporting latency monitoring at a second node of a transport network. The transport network is illustrated in one embodiment in FIG. 6. The transport network, 600, transports traffic to/from at least one wireless base station, 56. The apparatus, 1700, is provided at the second node, 54, of the transport network, 600, such as a remote node (remote switch). The apparatus, 1700, comprises a processing circuitry, including one or more processors, 1701, and a memory, 1702. The memory contains instructions, 1703, executable by the processing circuitry, 1701. The apparatus, 1700, is operative to receive a communication signal which carries data for the at least one wireless base station, 56, the data includes a data element. The apparatus, 1700, is operative to extract a first timestamp from the communication signal, wherein the first timestamp represents a time at which the data element was received at the first node, 58.

The apparatus is operative to receive an indication of an association between the first timestamp and a part of the communication signal that the first timestamp relates to. The apparatus, 1700, is operative to determine a second timestamp representing a time at which the data element is received at the second node. The apparatus, 1700, comprises one or more network interfaces, 1708, for interfacing with the transport network. The apparatus, 1700, comprises one or more network interfaces, 1709, for interfacing with other network entities, such as links which connect the second node, 54, to wireless base stations (e.g. the base station 56).

In the embodiment illustrated in FIG. 17 the interfaces, 1708 and 1709, processor, 1701 and memory, 1702 and 1704 are connected to a bus, 1706, however, other architectures of the apparatus, 1700, are also possible and would be envisaged by those skilled in the art. For example, the processor, memory modules and interfaces could be connected in series.

In the apparatus above the processing circuitry (processor 1601, 1701) comprises one or more processors which may be microprocessors, controllers or any other suitable type of processors for executing instructions to control the operation of the device. The processor is connected to other components of the device via one or more buses 1606, 1706. Processor-executable instructions 1603, 1703 may be provided using any computer-readable media, such as memory 1602, 1702. The processor-executable instructions can comprise instructions for implementing the functionality of the described methods. The memory 1602, 1702 is of any suitable type such as read-only memory (ROM), random access memory (RAM), a storage device of any type such as a magnetic or optical storage device. Additional memory 1604, 1704 can be provided to store data 1605, 1705 used by the processor 1601, 1701.

A solution as described above may provide accurate latency monitoring for packet based client links used for radio fronthauling or other time sensitive application.

Referring again to the network of FIG. 6, there are two types of wireless base station in the network. The two types of wireless base station are shown in FIG. 18A and FIG. 18B.

Figure 18A:
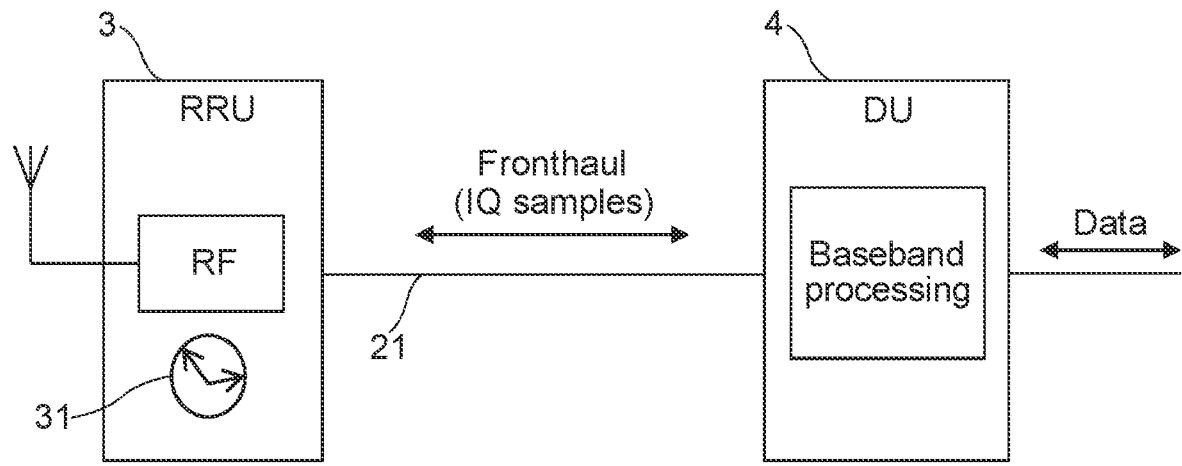
FIGS. 18A and 18B illustrate two types of wireless base station which can be used in the network of FIG. 1.

In the first type of wireless base station, shown in FIG. 18A, the functionality of the wireless base station is split between a remote radio unit (RRU) 3 and a digital unit (DU) 4. The DU 4 is configured to perform processing at baseband and to output digital baseband IQ data (i.e. real and imaginary components of the complex-valued baseband signal). The RRU 3 is configured to transmit an RF signal using the IQ data received from the DU 4. Similarly, the RRU 3 is configured to receive an RF signal and output IQ data of the received signal to the DU 4 for baseband processing. A CPRI interface carries the IQ data. Several IQ data flows are sent via one physical CPRI link, 21. Each IQ data flow reflects the data of one antenna for one carrier, the so-called antenna-carrier (AxC). Each RRU 3 may receive and send multiple AxC sub-flows. The traffic between DU 4 and RRU 3 (in either direction) is called fronthaul traffic.

In some examples, the RRU 3 may alternatively be called Radio Equipment (RE). In some examples, the DU 4 may alternatively be called a Main Unit (MU), Radio Equipment Controller (REC) or Baseband Unit (BBU). The RRU 3 communicates with a DU 4 using an interface standard, such as CPRI. References to CPRI are for example only, and may be replaced with a reference to any interface protocol for carrying data (e.g. in digital form) between a RRU and DU which uses a TDM-like format. A clock 31 is maintained at the RRU 3. Clock 31 provides a frequency reference for the RRU, such as when generating RF signals. Clock 31 also provides a phase reference for timing purposes, such as timing of RF transmissions.

Figure 18B:
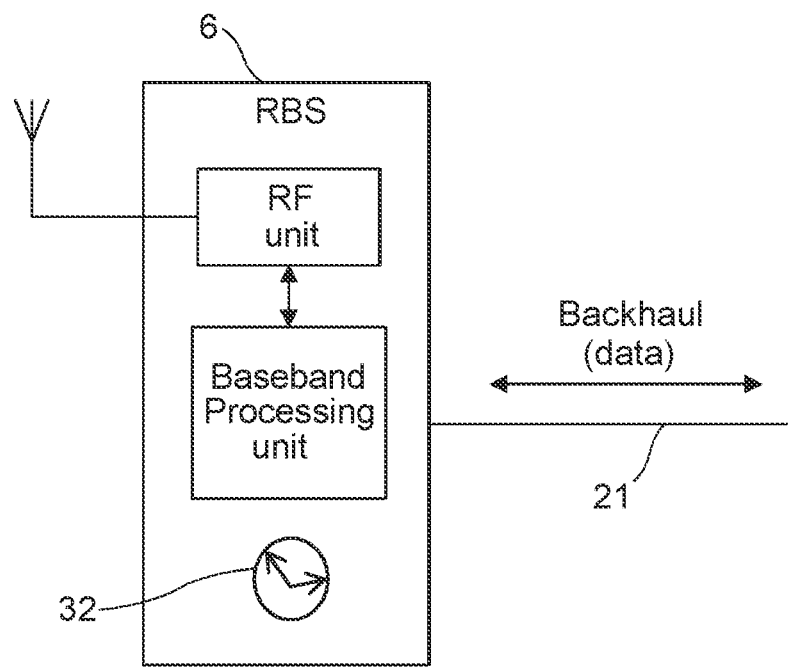

The second type of wireless base station 6, shown in FIG. 18B, does not have the split of radio (RF) and baseband functionality. Instead, in the wireless base station 6 all of the functionality of the wireless base station is combined. The radio unit (RF unit or radio frequency unit) and baseband processing unit are co-located. The term "co-located" means the radio functionality and baseband processing unit at the same cell site. It will be understood that there may be a small physical separation between the radio unit (RF unit) and the baseband processing unit at a cell site. For example, a radio unit may be located at the top of a tower or building and a baseband processing unit may be located at the base of the tower or building. This type of separation falls within the term "co-located". The wireless base station receives data, performs processing at baseband, and transmits/receives RF signals. This type of wireless base station is an integrated, or monolithic, base station and will be referred to as a radio base station RBS 6. An RBS 6 does not output a CPRI signal, since the baseband processing is implemented internally. An RBS 6 outputs and receives data in a different format than used by a RRU for radio transmission or baseband processing (e.g. CPRI). The traffic carried over the transport network 20 to and/or from the RBS 6 is called backhaul traffic. The RBS 6 communicates with the core network and other base stations. In some examples, the RBS 6 communicates with the core network and other base stations using the same transport protocol for at least some transport layers. For example, the RBS 6 uses a packet based data transport. In some examples, the RBS 6 uses Ethernet, as defined by IEEE 802.1 and IEEE 802.3. References to Ethernet are for example only, and may be replaced with a reference to any protocol for exchanging data to or from a radio base station, for example, packet transport. The transport connecting a base station may be based on a Layer 2 protocol on the Open Systems Interconnection model (OSI) model, or on a Layer 3 protocol. The RBS 6 may be a base station providing a micro cell or a pico cell, such as localised indoor coverage. A clock 32 is maintained at the RBS 6. Clock 32 provides a frequency reference for the RBS, such as when generating RF signals. Clock 32 also provides a phase reference for timing purposes, such as timing of RF transmissions.

Base stations RBS 6 (with baseband processing) and RRUs 3 (without baseband processing) may both be considered as radio equipment.

Figure 19A:
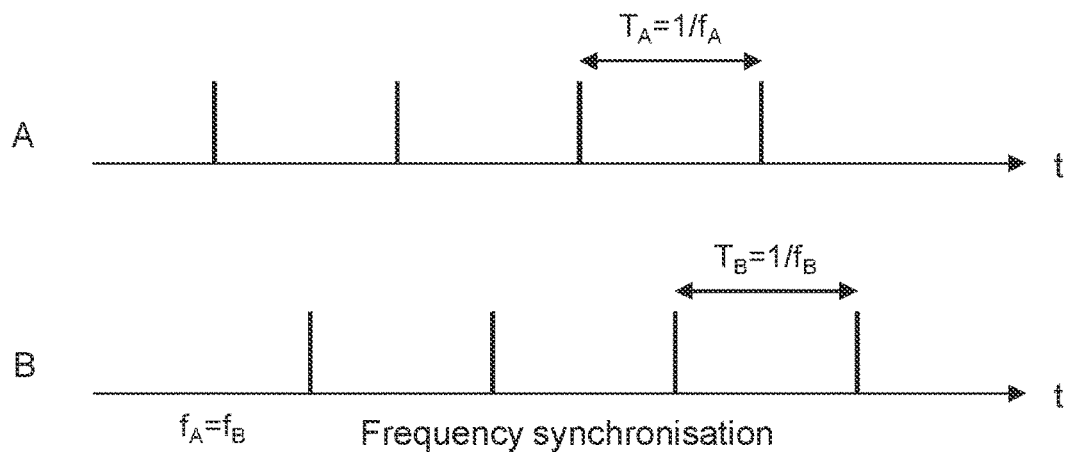
FIGS. 19A-19C illustrate types of synchronisation for a pair of nodes.
Figure 19B:
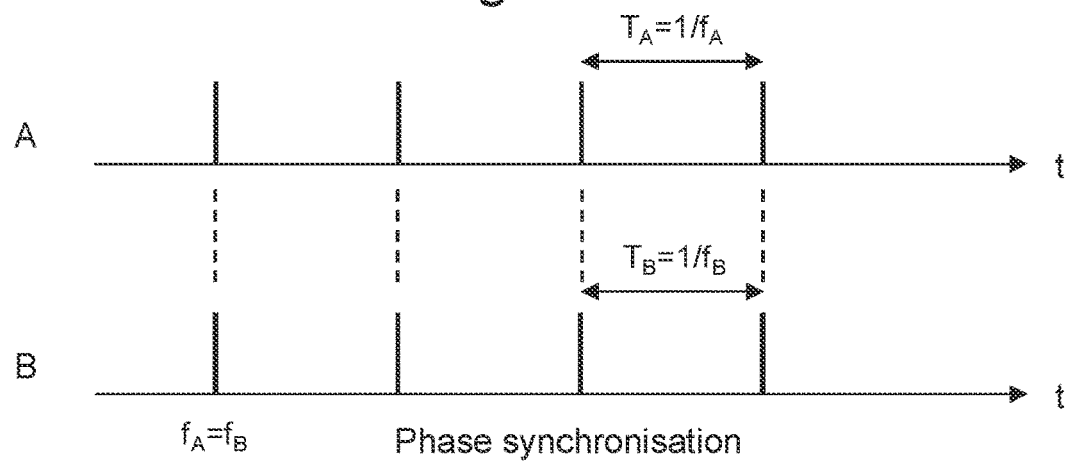
Figure 19C:
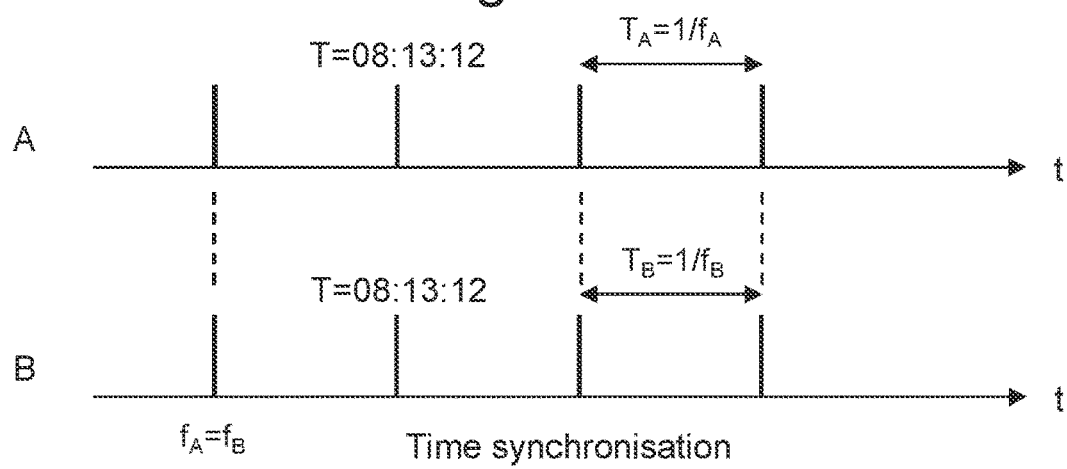

FIGS. 19A-19C illustrate three types of synchronisation in a network: frequency synchronisation (FIG. 19A); phase synchronisation (FIG. 19B); and time synchronisation (FIG. 19C). Two clocks are considered: a clock A at a first node and a clock B at a second node. A time line of each clock A, B, shows a series of clock "ticks". A clock tick could occur at a granularity of a second, a minute or some other granularity of time.

FIG. 19A shows frequency synchronisation. When two clocks are synchronised in frequency, the clock ticks at clocks A and B occur at the same rate, i.e. $T_A=1/f_A$, and $T_B=1/f_B$ and $f_A=f_B$.

FIG. 19B shows phase synchronisation. When two clocks are synchronised in phase, the clock ticks at clocks A and B occur at the same rate, i.e. $T_A=1/f_A$, and $T_B=1/f_B$ and $f_A=f_B$, and also the clock ticks are aligned in time with one another. That is, the clock tick at clock A occurs at the same point in time as the clock tick at clock B.

FIG. 19C shows time synchronisation. This is the same as phase synchronisation, with the additional feature that both clocks are set to the same time (e.g. time of day). In this example, a tick occurs at both clocks at the same time, and both clocks are aware that the time is 08:13:12.

Figure 20:
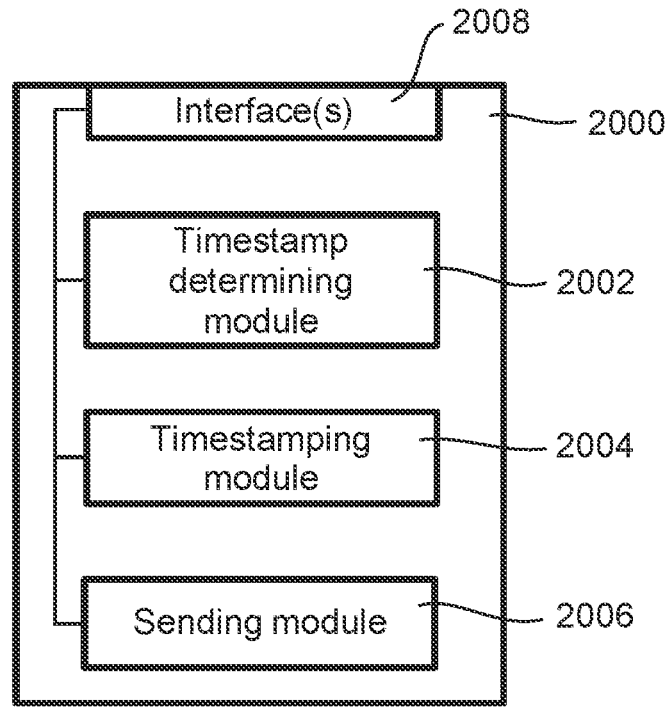
FIG. 20 illustrates an alternative embodiment of an apparatus for supporting latency monitoring at a first node of a transport network.

FIG. 20 illustrates yet another embodiment of an apparatus for supporting latency monitoring at a first node of a transport network. The transport network transports traffic (packets) to and from at least one wireless base station. The apparatus, 2000, comprises a timestamp determining module, 2002, for determining a first timestamp representing a time at which a data element is received at the first node. The apparatus 2000 also comprises a timestamping module for adding information representative of the first timestamp to a communication signal which carries data for the at least one wireless base station (the data includes the data element) and further comprises a sending module for sending an indication of an association between the information representative of the first timestamp and the data element that the information representative of the first timestamp relates to.

Figure 21:
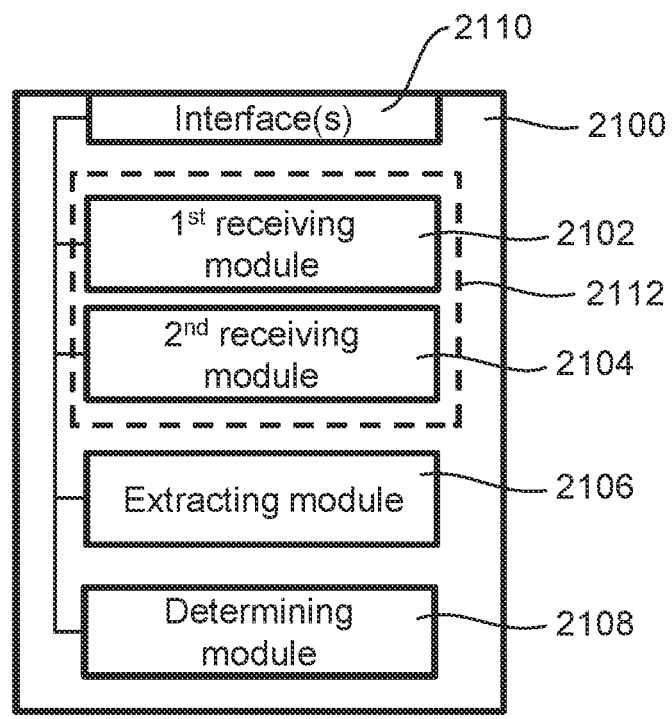
FIG. 21 illustrates an alternative embodiment of an apparatus for supporting latency monitoring at a second node of a transport network.

FIG. 21, in turn, illustrates yet another embodiment of an apparatus, 2100, for supporting latency monitoring at a second node of a transport network. The transport network transports traffic to and from at least one wireless base station and comprises a first node and the second node. The apparatus, 2100, comprises a first receiving module, 2102, for receiving a communication signal which carries data for the at least one wireless base station, wherein the data includes a data element. The apparatus, 2100, also comprises an extracting module, 2106, for extracting information representative of a first timestamp from the communication signal. The first timestamp representing a time at which the data element was received at the first node. Further, the apparatus, 2100, comprises a second receiving module, 2104, for receiving an indication of an association between the information representative of the first timestamp and a part of the communication signal that the information representative of the first timestamp relates to and a determining module, 2108, for determining information representative of a second timestamp representing a time at which the data element is received at the second node.

In a preferred embodiment the first receiving module, 2102, and the second receiving module, 2104, are integrated into a single module, 2112.

In the embodiments illustrated in FIGS. 20 and 21 the interfaces 2008 and 2110 serve for connecting traffic to and from the transport network as well as to and from the base station(s). These interfaces may be implemented as combined units (i.e. one interface serving traffic to/from transport network and to/from base station(s)) or as separate units similar to the embodiments illustrated in FIGS. 16 and 17.

In the embodiments illustrated in FIGS. 20 and 21 the interfaces as well as remaining modules are connected to a bus, however, other architectures of the apparatus, 2000 and 2100, are also possible and would be envisaged by those skilled in the art. For example, the modules and interfaces could be connected in series.

The apparatus, 2000 and 2001, illustrated in FIGS. 20 and 21 are configured to operated according to their corresponding methods (i.e. for first node and second node) described earlier in this document.

What is claimed is:

1. A method for use in a first node of a transport network for supporting latency monitoring in the transport network, the transport network transporting traffic to and from at least one wireless base station, the transport network comprising the first node and a second node, the method comprising:

determining a first timestamp representing a time at which a data element is received at the first node;

adding information representative of the first timestamp to a communication signal for sending to the second node, the communication signal carrying data for the at least one wireless base station, the data including the received data element; and sending an indication of an association between the information representative of the first timestamp and the data element that the information representative of the first timestamp relates to.

2. The method of claim 1, wherein the communication signal comprises a frame with an overhead and a payload, and the method adds the information representative of the first timestamp into the overhead part of the frame.

3. The method of claim 2, wherein the indication of an association is a pointer, and the method comprises adding the pointer to an overhead part of the communication signal, the pointer pointing to a part of the payload where the data element is carried.

4. The method of claim 1, wherein the indication of an association comprises an identifier of a client link carried by the frame.

5. The method of claim 1, wherein the information representative of the first timestamp comprises said first timestamp or result of modulo operation on said first timestamp.

6. A method for use in a second node of a transport network for supporting latency monitoring in the transport network, the transport network transporting traffic to and from at least one wireless base station, the transport network comprising a first node and the second node, the method comprising:

receiving a communication signal which carries data for the at least one wireless base station, the data including a data element;

extracting information representative of a first timestamp from the communication signal, the first timestamp representing a time at which the data element was received at the first node;

receiving an indication of an association between the information representative of the first timestamp and a part of the communication signal that the information representative of the first timestamp relates to; and determining a second timestamp representing a time at which the data element is received at the second node.

7. The method of claim 6, wherein the indication of an association comprises a pointer in an overhead part of the communication signal, the pointer pointing to a part of the payload where the data element is carried.

8. The method of claim 7, wherein the indication of an association is received in advance of the information representative of the first timestamp.

9. The method of claim 6, wherein the communication signal is a signal for carrying fronthaul data and backhaul data.

10. The method of claim 6, wherein the communication signal comprises a frame with an overhead and a plurality of payload areas into which signals/data can be mapped, the payload areas comprising one or more of:

a payload area for carrying Common Public Radio Interface (CPRI) signals;

a payload area for carrying Ethernet signals.

11. The method of claim 6, wherein the information representative of the first timestamp comprises said first timestamp or result of modulo operation on said first timestamp and wherein the information representative of the second timestamp comprises said second timestamp or result of modulo operation on said second timestamp.

12. An apparatus for supporting latency monitoring at a first node of a transport network, the transport network transporting traffic to and from at least one wireless base station, the transport network comprising the first node and a second node, the apparatus comprising a processing circuitry and a memory, the memory containing instructions executable by the processing circuitry such that the apparatus is configured to:
- determine a first timestamp representing a time at which a data element is received at the first node;
- add information representative of the first timestamp to a communication signal for sending to the second node, the communication signal carrying data for the at least one wireless base station, the data including the received data element; and
- send an indication of an association between the information representative of the first timestamp and the data element that the information representative of the first timestamp relates to.

13. The apparatus of claim 12, wherein the communication signal comprises a frame with an overhead and a payload, and the apparatus is configured to add the information representative of the first timestamp into the overhead part of the frame.

14. The apparatus of claim 13, wherein the indication of an association is a pointer and the apparatus is configured to add the pointer to an overhead part of the communication signal, the pointer pointing to a part of the payload where the data element is carried.

15. The apparatus of claim 12, wherein the apparatus is configured to use an identifier of a client link carried by the frame as the indication of an association.

16. An apparatus for supporting latency monitoring at a second node of a transport network, the transport network transporting traffic to and from at least one wireless base station, the transport network comprising a first node and the second node, the apparatus comprising a processing circuitry and a memory, the memory containing instructions executable by the processing circuitry such that the apparatus is configured to:
- receive a communication signal which carries data for the at least one wireless base station, the data including a data element;
- extract information representative of a first timestamp from the communication signal, the first timestamp representing a time at which the data element was received at the first node;
- receive an indication of an association between the information representative of the first timestamp and a part of the communication signal that the information representative of the first timestamp relates to;
- determine a second timestamp representing a time at which the data element is received at the second node.

17. The apparatus of claim 16, wherein the apparatus is operative to determine a difference between information representative of the second timestamp and the information representative of the first timestamp, the difference representing latency of the data element.

18. The apparatus of claim 16, wherein the indication of an association comprises a pointer in an overhead part of the communication signal, the pointer pointing to a part of the payload where the data element is carried.

19. The apparatus of claim 16, wherein the apparatus is operative to receive the indication of an association in advance of the information representative of the first timestamp.

20. The apparatus of claim 16, wherein the information representative of the first timestamp comprises said first timestamp or result of modulo operation on said first timestamp and wherein the information representative of the second timestamp comprises said second timestamp or result of modulo operation on said second timestamp.

21. A transport network for transporting traffic to and from at least one wireless base station comprising a second node comprising the apparatus of claim 16, and further comprising a first node comprising apparatus for supporting latency monitoring at the first node, the transport network transporting traffic to and from at least one wireless base station, the apparatus of the first node comprising a processing circuitry and a memory, the memory containing instructions executable by the processing circuitry such that the apparatus is configured to:
- determine a first timestamp representing a time at which a data element is received at the first node;
- add information representative of the first timestamp to a communication signal for sending to the second node, the communication signal carrying data for the at least one wireless base station, the data including the received data element; and
- send an indication of an association between the information representative of the first timestamp and the data element that the information representative of the first timestamp relates to.

* * * * *

UNITED STATES PATENT AND TRADEMARK OFFICE
CERTIFICATE OF CORRECTION

| | |
|---|---|
| PATENT NO. | : 11,811,634 B2 |
| APPLICATION NO. | : 17/366355 |
| DATED | : November 7, 2023 |
| INVENTOR(S) | : Ruffini et al. |

It is certified that error appears in the above-identified patent and that said Letters Patent is hereby corrected as shown below:

In the Specification

In Column 7, Line 10, delete "eCRPI" and insert -- eCPRI --, therefor.

In Column 7, Line 11, delete ".info/downloads/eCPRI_v_I_0_2017_08_22.pdf." and insert -- .info/downloads/eCPRI_v_1_0_2017_08_22.pdf. --, therefor.

In Column 10, Line 21, delete "$t_{1mod16ms}$" and insert -- $t_{1mod16ms}$ --, therefor.

Signed and Sealed this
Sixteenth Day of April, 2024

Katherine Kelly Vidal
*Director of the United States Patent and Trademark Office*